(12) United States Patent
Wakimoto et al.

(10) Patent No.: US 11,404,754 B2
(45) Date of Patent: Aug. 2, 2022

(54) SECONDARY BATTERY

(71) Applicant: SANYO Electric Co., Ltd., Daito (JP)

(72) Inventors: Ryoichi Wakimoto, Hyogo (JP);
Hirofumi Furukawa, Hyogo (JP);
Hiroyuki Yamada, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 378 days.

(21) Appl. No.: 16/479,761

(22) PCT Filed: Jan. 23, 2018

(86) PCT No.: PCT/JP2018/001998
§ 371 (c)(1),
(2) Date: Jul. 22, 2019

(87) PCT Pub. No.: WO2018/139454
PCT Pub. Date: Aug. 2, 2018

(65) Prior Publication Data
US 2021/0328311 A1 Oct. 21, 2021

(30) Foreign Application Priority Data

Jan. 25, 2017 (JP) .............................. JP2017-011357

(51) Int. Cl.
*H01M 50/578* (2021.01)
*H01M 50/188* (2021.01)
(Continued)

(52) U.S. Cl.
CPC ..... *H01M 50/578* (2021.01); *H01M 10/0481* (2013.01); *H01M 50/147* (2021.01); *H01M 50/188* (2021.01)

(58) Field of Classification Search
CPC . H01M 50/578; H01M 50/188; H01M 50/147
See application file for complete search history.

(56) References Cited

U.S. PATENT DOCUMENTS

| 6,524,739 B1 | 2/2003 | Iwaizono et al. |
| 2013/0196185 A1 | 8/2013 | Yokoyama et al. |

(Continued)

FOREIGN PATENT DOCUMENTS

| CN | 103227306 A | 7/2013 |
| CN | 105655537 A | 6/2016 |

(Continued)

OTHER PUBLICATIONS

International Search Report dated Apr. 10, 2018, issued in counterpart Application No. PCT/JP2018/001998 (1 page).
(Continued)

*Primary Examiner* — Brian R Ohara
*Assistant Examiner* — Emily Elizabeth Freeman
(74) *Attorney, Agent, or Firm* — WHDA, LLP

(57) ABSTRACT

A conductive member is disposed near a side of the sealing plate facing an electrode assembly with a first insulating member disposed therebetween. The conductive member has a conductive-member opening portion. The conductive member is connected to a positive electrode terminal that projects toward au outside of the battery from the sealing plate. The conductive-member opening portion of the conductive member is sealed by a deformation plate. The deformation plate is connected to a first positive-electrode current collector of a current collecting member, which is electrically connected to positive electrode plates. The deformation plate is deformed in response to an increase in pressure in a rectangular exterior body, and the conductive path between the positive electrode plate and the positive electrode terminal is broken in response to the deformation of the deformation plate. A cover is disposed between the first positive-electrode current collector and the electrode assembly.

9 Claims, 16 Drawing Sheets

(51) Int. Cl.
  *H01M 50/147* (2021.01)
  *H01M 10/04* (2006.01)

(56) References Cited

U.S. PATENT DOCUMENTS

| | | | | |
|---|---|---|---|---|
| 2015/0079432 A1* | 3/2015 | Okuda | ............... | H01G 11/16 |
| | | | | 429/61 |
| 2015/0295221 A1* | 10/2015 | Urano | ............ | H01M 50/578 |
| | | | | 429/61 |
| 2018/0047971 A1 | 2/2018 | Hirose et al. | | |

FOREIGN PATENT DOCUMENTS

| | | |
|---|---|---|
| JP | 2000-149918 A | 5/2000 |
| JP | 2013-157099 A | 8/2013 |
| JP | 2014-116277 A | 6/2014 |
| JP | 2015-115327 A | 6/2015 |
| JP | 2017-117647 A | 6/2017 |
| JP | 2018-29033 A | 2/2018 |
| WO | 2016/147955 A1 | 9/2016 |

OTHER PUBLICATIONS

English Translation of Office Action dated Aug. 24, 2021, issued in counterpart CN Application No. 201880007748.0. (4 pages).

\* cited by examiner 3a, 3b

SECONDARY BATTERY

TECHNICAL FIELD

The present invention relates to a secondary battery.

BACKGROUND ART

Driving power sources of, for example, electric vehicles (EVs) and hybrid electric vehicles (HEVs or PHEVs) include secondary batteries, such as alkaline secondary batteries and nonaqueous electrolyte secondary batteries.

A rectangular secondary battery includes a battery case constituted by a rectangular exterior body having the shape of a tube with an opening and a bottom and a sealing plate that seals the opening. The battery case contains an electrode assembly, which includes positive electrode plates, negative electrode plates, and separators, together with an electrolyte. A positive electrode terminal and a negative electrode terminal are attached to the sealing plate. The positive electrode terminal is electrically connected to the positive electrode plates by a positive-electrode current collector, and the negative electrode terminal is electrically connected to the negative electrode plates by a negative-electrode current collector.

A rectangular secondary battery including a current interruption mechanism has been proposed (see PTL 1 below). The current interruption mechanism is activated and breaks a conductive path between an electrode assembly and a terminal to interrupt current when a pressure in a battery case reaches or exceeds a predetermined value due to, for example, overcharging.

CITATION LIST

Patent Literature

PTL 1: Japanese Published Unexamined Patent Application No. 2013-157099

SUMMARY OF INVENTION

Technical Problem

A secondary battery including a current interruption mechanism is highly reliable in terms of, for example, protection against overcharging. However, secondary batteries with higher reliabilities are desired.

The main object of the present invention is to provide a secondary battery with increased reliability.

Solution to Problem

A secondary battery according to an embodiment of the present invention includes an electrode assembly including a positive electrode plate and a negative electrode plate;

an exterior body having an opening and containing the electrode assembly;

a sealing plate that seals the opening;

a conductive member having an opening portion at a side facing the electrode assembly and disposed near a side of the sealing plate facing the electrode assembly;

a deformation plate that seals the opening portion and that is deformed in response to an increase in a pressure in the exterior body;

a current collecting member that electrically connects the positive electrode plate or the negative electrode plate to the deformation plate; and a terminal that is electrically connected to the positive electrode plate or the negative electrode plate via the current collecting member, the deformation plate, and the conductive member.

A cover is disposed between a region of the current collecting member between the deformation plate and the electrode plate and the electrode assembly.

A conductive path between the positive electrode plate and the terminal or between the negative electrode plate and the terminal is broken in response to a deformation of the deformation plate.

In the above-described structure, the cover is disposed between the current collecting member and the electrode assembly. Accordingly, even when the secondary battery is strongly impacted or vibrated and the electrode assembly is moved toward the sealing plate, the electrode assembly can be prevented from coming into contact with the current collecting member located on a side of the deformation plate facing the electrode assembly and causing damage or breakage of, for example, a weak portion of the current collecting member that serves as a portion expected to break or the connecting portion between the deformation plate and the current collecting member. Accordingly, a secondary battery with increased reliability can be provided.

When the deformation plate is deformed in response to an increase in pressure in the battery case constituted by the exterior body and the sealing plate, preferably, the current collecting member, the connecting portion between the current collecting member and the deformation plate, or the deformation plate breaks so that the conductive path is broken. Preferably, the current collecting member includes a weak portion, such as a thin portion or a notch, as a portion expected to break in response to a deformation of the deformation plate. The connecting portion between the current collecting member and the deformation plate may serve as a portion expected to break. Alternatively, the deformation plate may include a weak portion, such as a thin portion or a notch, as a portion expected to break.

Preferably, an insulating member is disposed between the deformation plate and the current collecting member, and the insulating member is separate from the cover. According to such a structure, the secondary battery can be easily assembled.

Preferably, the insulating member disposed between the deformation plate and the current collecting member includes a fixing projection, the current collecting member has a fixing hole, and the insulating member disposed between the deformation plate and the current collecting member is fixed to the current collecting member such that the fixing projection is fitted to the fixing hole. According to such a structure, load applied to the weak portion of the current collecting member or the connecting portion between the deformation plate and the current collecting member during a normal operation of the secondary battery can be reduced.

Preferably, a first insulating member is disposed between the sealing plate and the conductive member, and a second insulating member is disposed between the deformation plate and the current collecting member. The cover is separate from the first insulating member and the second insulating member. The cover is connected to at least one of the first insulating member and the second insulating member. According to such a structure, the secondary battery can be easily assembled. In addition, preferably, the second insulating member includes a fixing projection, the current collecting member has a fixing hole, and the second insulating member and the current collecting member are fixed to each other such that the fixing projection is fitted to the fixing hole. Accordingly, load applied to the weak portion of the current collecting member or the connecting portion between the deformation plate and the current collecting member can be reduced.

Preferably, the electrode assembly includes a positive-electrode tab connected to the positive electrode plate and a negative-electrode tab connected to the negative electrode plate at a side thereof adjacent to the sealing plate, and the positive-electrode tab or the negative-electrode tab is connected to a portion of the current collecting member that extends along the sealing plate. According to such a structure, the volume energy density of the secondary battery can be increased. In addition, the above-described structure is particularly effective because the electrode assembly easily moves toward the sealing plate.

Preferably, an insulating member is disposed between the sealing plate and the current collecting member. The insulating member is preferably a portion of the insulating member disposed between the sealing plate and the conductive member or a portion of the insulating member disposed between the deformation plate and the current collecting member.

Preferably, the current collecting member includes a first current collecting member connected to the deformation plate and a second current collecting member connected to the positive-electrode tab or the negative-electrode tab, and the cover is disposed between the electrode assembly and a connecting portion between the first current collecting member and the second current collecting member.

Preferably, a gap is provided between the current collecting member and the cover in a direction perpendicular to the sealing plate. According to such a structure, load applied to the weak portion of the current collecting member or the connecting portion between the deformation plate and the current collecting member can be reduced.

Advantageous Effects of Invention

The present invention provides a secondary battery with increased reliability.

DESCRIPTION OF EMBODIMENTS

The structure of a rectangular secondary battery 20, which is a secondary battery according to an embodiment, will now be described. The present invention is not limited to the embodiment.

Figure 1:
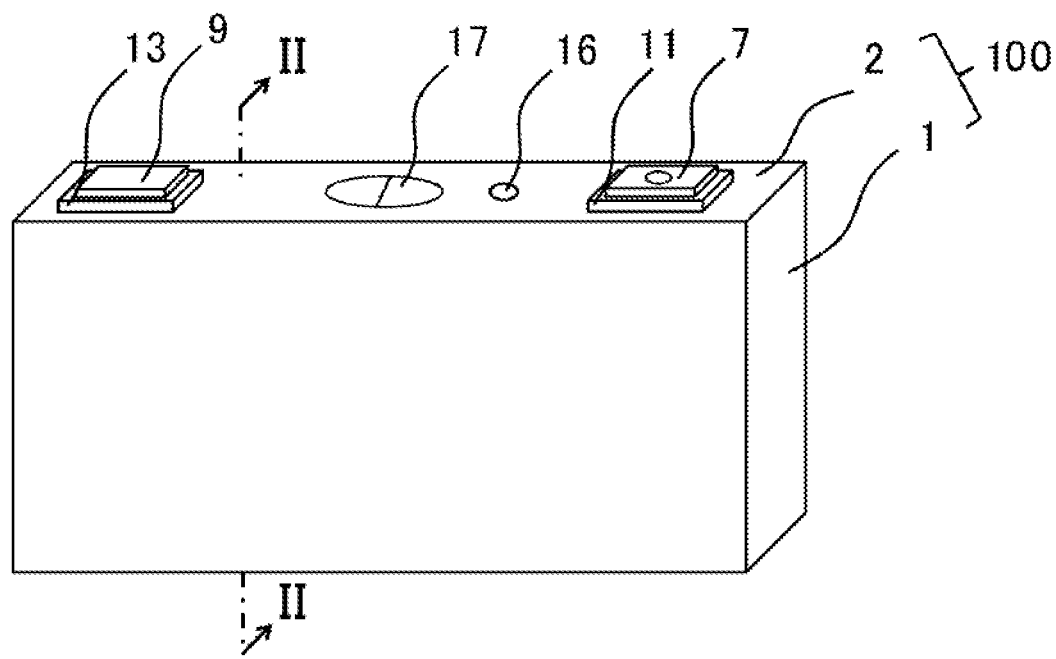
FIG. 1 is a perspective view of a secondary battery according to an embodiment.
Figure 2:
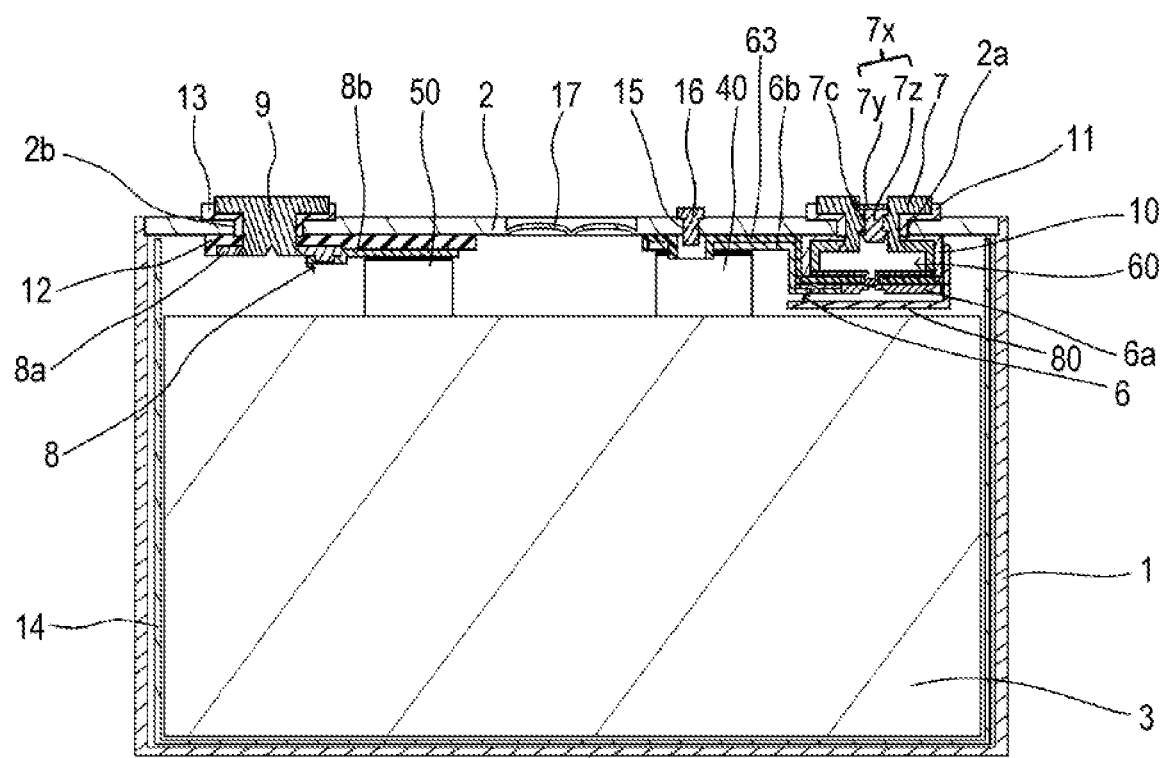
FIG. 2 is a sectional view taken along line II-II in FIG. 1.

FIG. 1 is a perspective view of the rectangular secondary battery 20. FIG. 2 is a sectional view taken along line II-II in FIG. 1. As illustrated in FIGS. 1 and 2, the rectangular secondary battery 20 includes a battery case 100 constituted by a rectangular exterior body 1 having the shape of a rectangular tube with an opening and a bottom and a sealing plate 2 that seals the opening in the rectangular exterior body 1. The rectangular exterior body 1 and the sealing plate 2 are each preferably made of a metal, for example, aluminum or an aluminum alloy. The rectangular exterior body 1 contains an electrode assembly 3 together with an electrolyte. The electrode assembly 3 has a stacked structure in which positive electrode plates and negative electrode plates are stacked together with separators interposed therebetween. An insulating sheet 14 made of a resin is disposed between the electrode assembly 3 and the rectangular exterior body 1.

Positive-electrode tabs 40 and negative-electrode tabs 50 are provided at an end of the electrode assembly 3 that is adjacent to the sealing plate 2. The positive-electrode tabs 40 are electrically connected to a positive electrode terminal 7 via a second positive-electrode current collector 6b and a first positive-electrode current collector 6a. The negative-electrode tabs 50 are electrically connected to a negative electrode terminal 9 via a second negative-electrode current collector 8b and a first negative-electrode current collector 8a. The first positive-electrode current collector 6a and the second positive-electrode current collector 6b constitute a positive-electrode current collecting member 6. The first negative-electrode current collector 8a and the second negative-electrode current collector 8b constitute a negative-electrode current collecting member 8. The positive-electrode current collecting member 6 may instead be constituted by a single component. Also, the negative-electrode current collecting member 8 may instead be constituted by a single component.

The positive electrode terminal 7 is fixed to the sealing plate 2 with an outer insulating member 11 made of a resin interposed therebetween. The negative electrode terminal 9 is fixed to the sealing plate 2 with an outer insulating member 13 made of a resin interposed therebetween. The positive electrode terminal 7 is preferably made of a metal, more preferably aluminum or an aluminum alloy. The negative electrode terminal 9 is preferably made of a metal, more preferably copper or a copper alloy.

A conductive path between the positive electrode terminal 7 and the positive electrode plates is preferably provided with a current interruption mechanism 60 that is activated to break the conductive path between the positive electrode terminal 7 and the positive electrode plates when a pressure in the battery case 100 reaches or exceeds a predetermined value. A conductive path between the negative electrode terminal 9 and the negative electrode plates may also be provided with a current interruption mechanism.

The sealing plate 2 is provided with a gas discharge valve 17 that breaks to enable gas in the battery case 100 to be discharged out of the battery case 100 when the pressure in the battery case 100 reaches or exceeds a predetermined value. The activating pressure of the gas discharge valve 17 is set to a pressure higher than the activating pressure of the current interruption mechanism 60.

The sealing plate 2 has an electrolyte introduction hole 15. The electrolyte introduction hole 15 is sealed by a sealing plug 16 after the electrolyte is introduced into the battery case 100 through the electrolyte introduction hole 15. The sealing plug 16 is preferably a blind rivet.

A method for manufacturing the rectangular secondary battery 20 and components of the rectangular secondary battery 20 will now be described in detail.

[Production of Positive Electrode Plate]

A positive electrode slurry containing a lithium nickel cobalt manganese composite oxide as a positive electrode active material, polyvinylidene fluoride (PVdF) as a binder, a carbon material as a conductive agent, and N-methyl-2-pyrrolidone (NMP) as a dispersion medium is prepared. The positive electrode slurry is applied to both sides of a rectangular piece of aluminum foil having a thickness of 15 μm that serves as a positive electrode core. Then, the positive electrode slurry is dried to remove NMP contained therein so that positive electrode active material mixture layers are formed on the positive electrode core. After that, a compression process is performed so that the thickness of the positive electrode active material mixture layers is reduced to a predetermined thickness. The thus-obtained positive electrode plate is cut into a predetermined shape.

Figure 3:
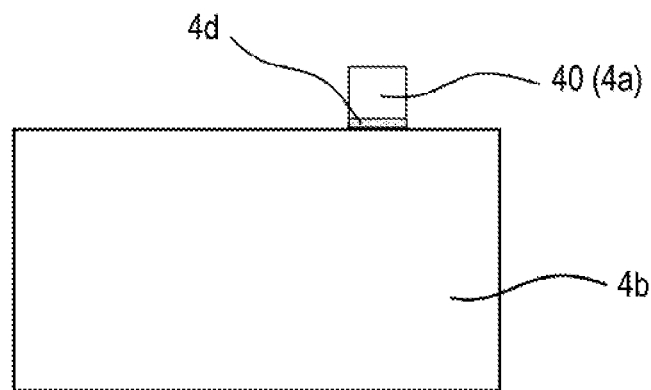
FIG. 3 is a plan view of a positive electrode plate according to the embodiment.

FIG. 3 is a plan view of a positive electrode plate 4 produced by the above-described method. As illustrated in FIG. 3, the positive electrode plate 4 includes a main portion in which positive electrode active material mixture layers 4b are formed on both sides of a positive electrode core 4a having a rectangular shape. The positive electrode core 4a projects from an edge of the main portion, and the projecting portion of the positive electrode core 4a constitutes the positive-electrode tab 40. The positive-electrode tab 40 may either be a portion of the positive electrode core 4a, as illustrated in FIG. 3, or be constituted by another member that is connected to the positive electrode core 4a. The positive-electrode tab 40 preferably includes positive-electrode protecting layers 4d having an electrical resistance higher than that of the positive electrode active material mixture layers 4b in regions adjacent to the positive electrode active material mixture layers 4b.

[Production of Negative Electrode Plate]

A negative electrode slurry containing graphite as a negative electrode active material, styrene-butadiene rubber (SBR) as a binder, carboxymethyl cellulose (CMC) as a thickener, and water is prepared. The negative electrode slurry is applied to both sides of a rectangular piece of copper foil having a thickness of 8 μm that serves as a negative electrode core. Then, the negative electrode slurry is dried to remove water contained therein so that negative electrode active material mixture layers are formed on the negative electrode core. After that, a compression process is performed so that the thickness of the negative electrode active material mixture layers is reduced to a predetermined thickness. The thus-obtained negative electrode plate is cut into a predetermined shape.

Figure 4:
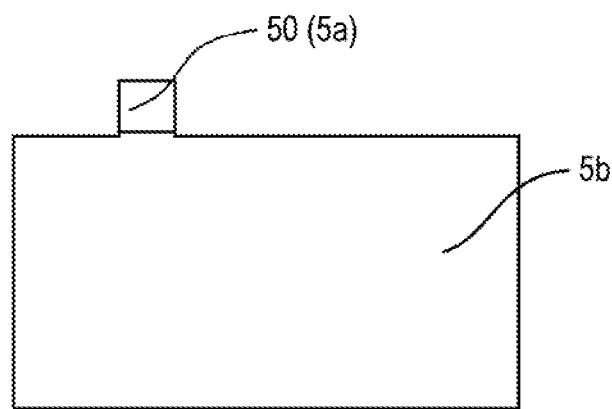
FIG. 4 is a plan view of a negative electrode plate according to the embodiment.

FIG. 4 is a plan view of a negative electrode plate 5 produced by the above-described method. As illustrated in FIG. 4, the negative electrode plate 5 includes a main portion in which negative electrode active material mixture layers 5b are formed on both sides of a negative electrode core 5a having a rectangular shape. The negative electrode core 5a projects from an edge of the main portion, and the projecting portion of the negative electrode core 5a constitutes the negative-electrode tab 50. The negative-electrode tab 50 may either be a portion of the negative electrode core 5a, as illustrated in FIG. 4, or be constituted by another member that is connected to the negative electrode core 5a.

[Production of Electrode Assembly Unit]

Figure 5:
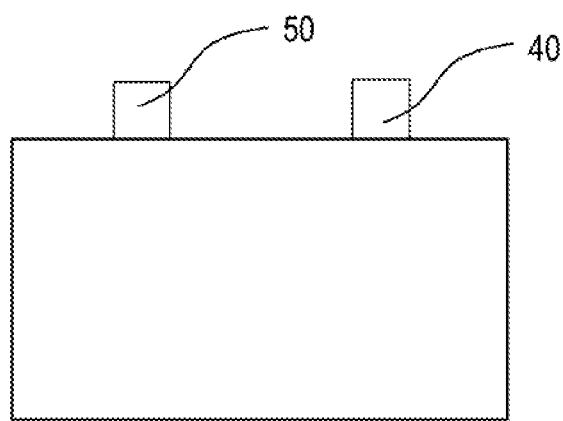
FIG. 5 is a plan view of an electrode assembly element according to the embodiment.

Electrode assembly units (3a and 3b) having a stacked structure are each produced by preparing 50 positive electrode plates 4 and 51 negative electrode plates 5 produced by the above-described method and stacking them together with rectangular separators made of polyolefin interposed therebetween. As illustrated in FIG. 5, each electrode assembly element (3a, 3b) having a stacked structure is formed so that the positive-electrode tabs 40 of the positive electrode plates 4 and the negative-electrode tabs 50 of the negative electrode plates 5 are stacked together at one end thereof. Each electrode assembly element (3a, 3b) has separators at the outer sides thereof, and the electrode plates and the separators may be fastened together in the stacked state with a piece of tape or the like. Alternatively, the separators may be provided with adhesive layers so that the separators are bonded to the positive electrode plates 4 and to the negative electrode plates 5.

The size of the separators in plan view is preferably greater than or equal to that of the negative electrode plates 5. The positive electrode plates 4 and the negative electrode plates 5 may be stacked together after placing each of the positive electrode plates 4 between two separators and thermally welding the separators at the peripheral edge thereof. Each electrode assembly element (3a, 3b) may instead be produced by using an elongated separator and stacking the positive electrode plates 4 and the negative electrode plates 5 while fan-folding the elongated separator, or by using an elongated separator and stacking the positive electrode plates 4 and the negative electrode plates 5 while winding the elongated separator.

[Attachment of Components to Sealing Plate (Positive Electrode Side)]

Figure 6:
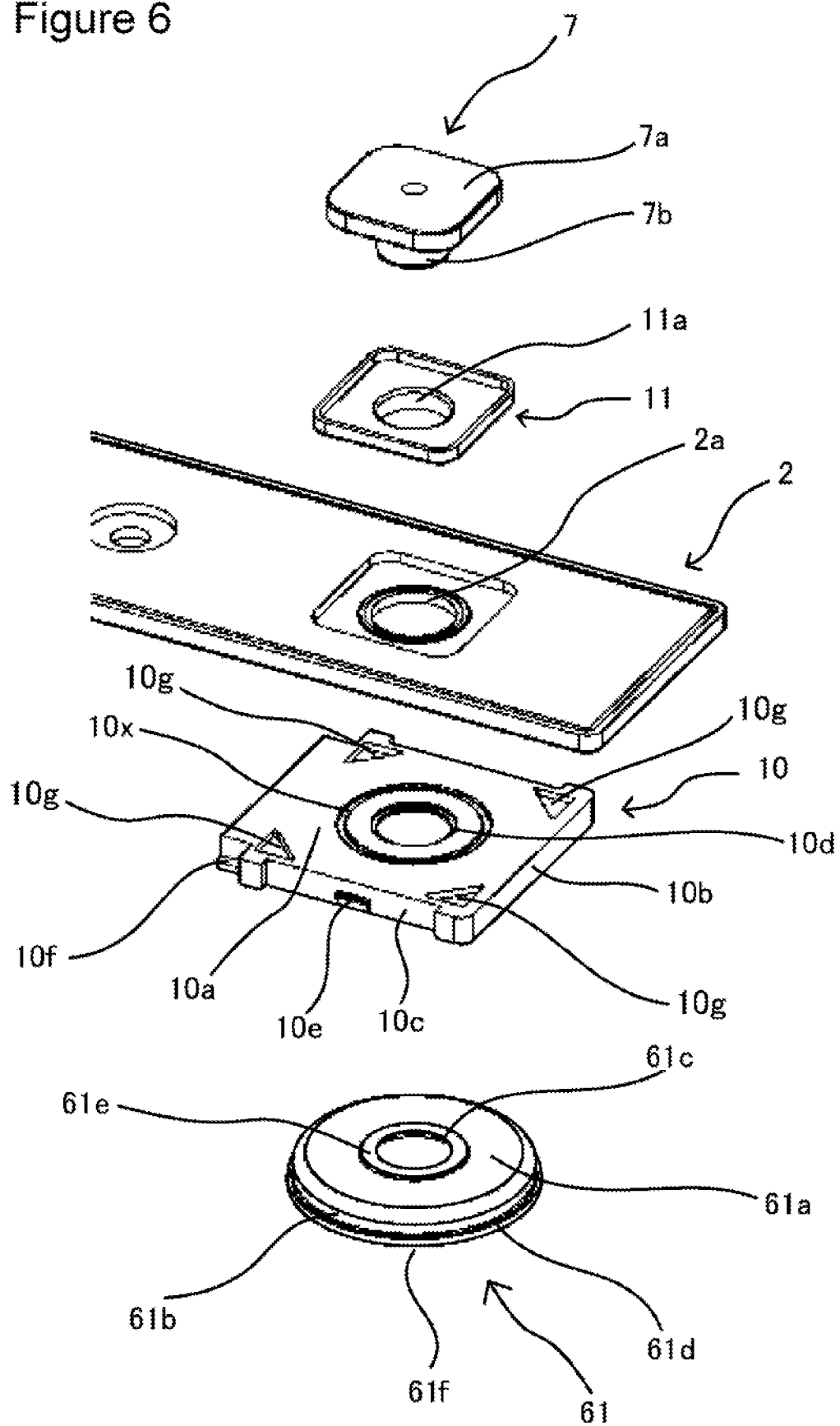
FIG. 6 is a perspective view illustrating a positive electrode terminal, an outer insulating member, a sealing plate, a first insulating member, and a conductive member.
Figure 7:
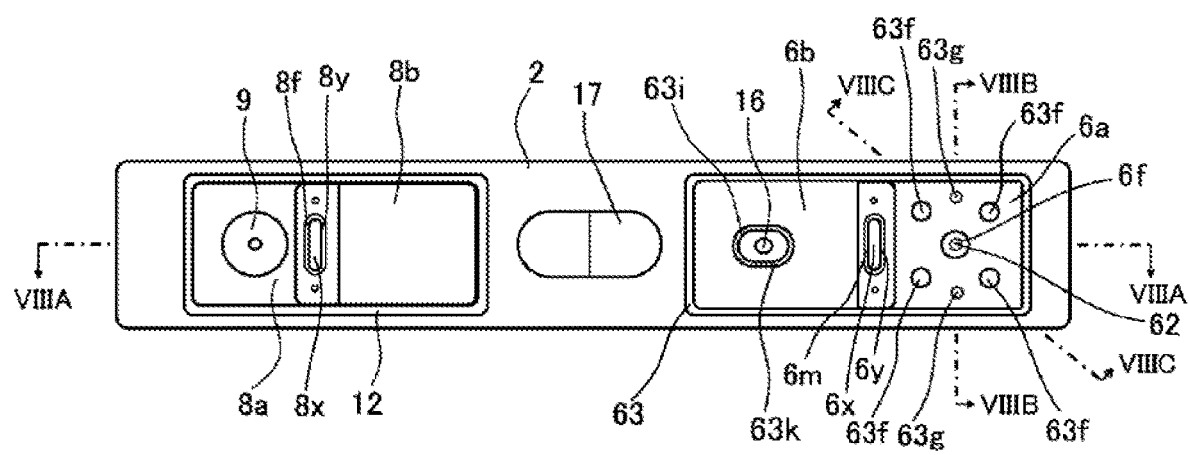
FIG. 7 is a bottom view of the sealing plate to which components are attached.
Figure 8A:
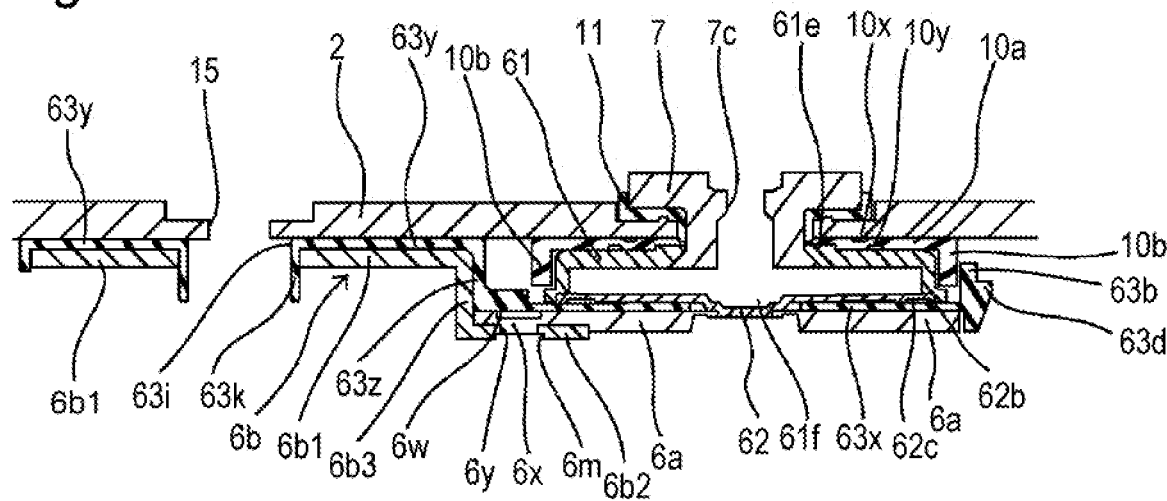
FIG. 8A is a sectional view taken along line VIIIA-VIIIA in FIG. 7.
Figure 8B:
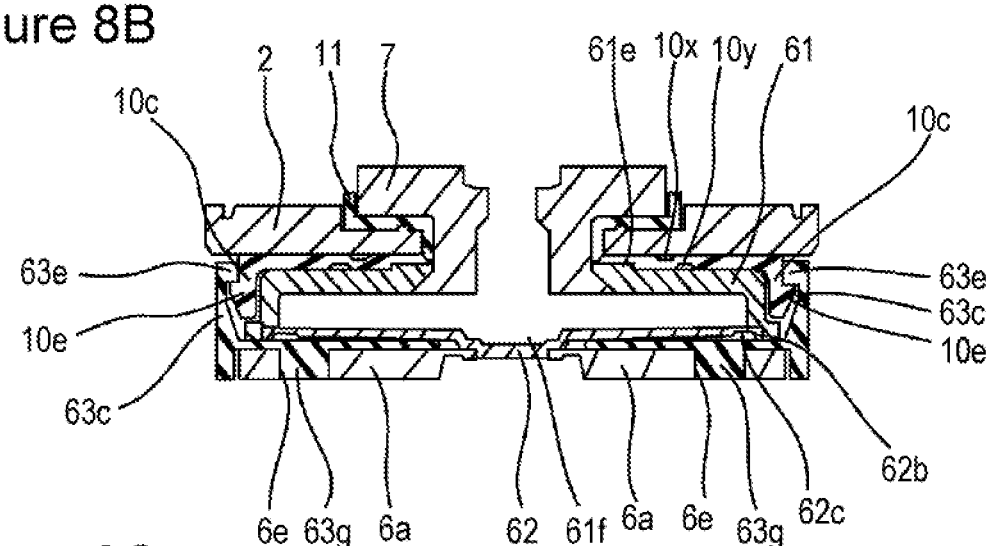
FIG. 8B is a sectional view taken along line VIIIB-VIIIB in FIG. 7.
Figure 8C:
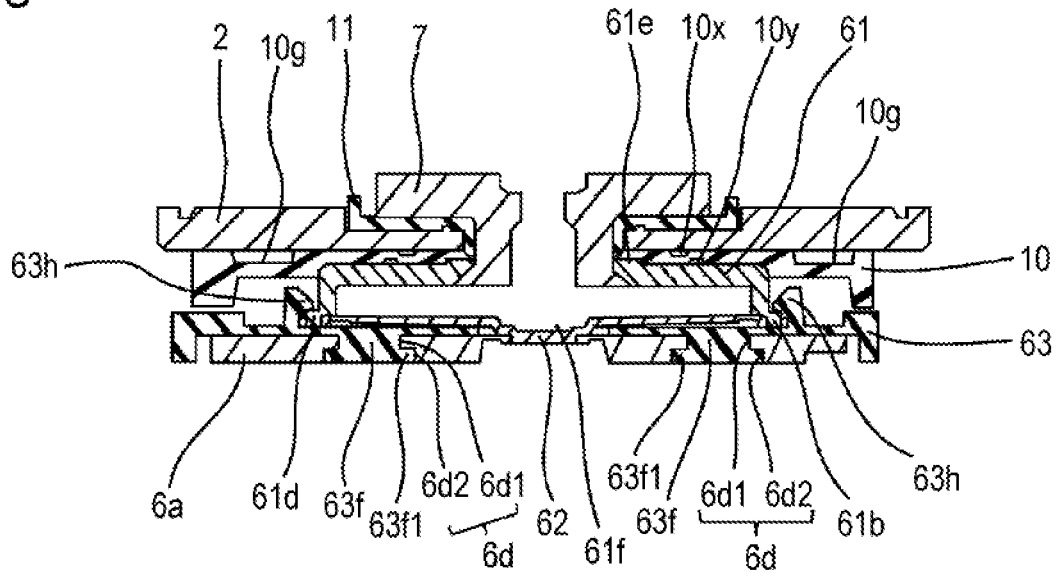
FIG. 8C is a sectional view taken along line VIIIC-VIIIC in FIG. 7.

A method for attaching the positive electrode terminal 7, the first positive-electrode current collector 6a, and other components to the sealing plate 2 and the structure of a part including the positive electrode terminal 7 will be described with reference to FIGS. 2 and 6 to 8. FIG. 6 is a perspective view illustrating the positive electrode terminal 7, the outer insulating member 11, the sealing plate 2, a first insulating member 10, and a conductive member 61 before assembly. FIG. 7 illustrates the sealing plate 2 to which the components are attached when viewed from the inside of the battery. FIG. 7 does not illustrate the positive-electrode tabs 40 and the negative-electrode tabs 50. FIG. 8A is a sectional view of the part including the positive electrode terminal 7 taken along line VIIIA-VIIIA in FIG. 7. FIG. 8B is a sectional view of the part including the positive electrode terminal 7 taken along line VIIIB-VIIIB in FIG. 7. FIG. 8C is a sectional view of the part including the positive electrode terminal 7 taken along line VIIIC-VIIIC in FIG. 7.

The outer insulating member 11 is placed on a surface of the sealing plate 2 that faces the outside of the battery in a region including a positive-electrode-terminal attachment hole 2a. The first insulating member 10 and the conductive member 61 are placed on a surface of the sealing plate 2 that faces the inside of the battery in the region including the positive-electrode-terminal attachment hole 2a. Next, an inserting portion 7b provided on one side of a flange 7a of the positive electrode terminal 7 is inserted through a first terminal-receiving hole 11a in the outer insulating member 11, the positive-electrode-terminal attachment hole 2a in the sealing plate 2, a second terminal-receiving hole 10d in the first insulating member 10, and a third terminal-receiving hole 61c in the conductive member 61. Then, the inserting portion 7b is crimped onto the conductive member 61 at the end thereof. Thus, the positive electrode terminal 7, the outer insulating member 11, the sealing plate 2, the first insulating member 10, and the conductive member 61 are fixed together. When the inserting portion 7b of the positive electrode terminal 7 is crimped, a large-diameter portion having an outer diameter greater than the inner diameter of the third terminal-receiving hole 61c in the conductive member 61 is formed at the end of the inserting portion 7b. The crimped portion of the inserting portion 7b of the positive electrode terminal 7 is preferably welded to the conductive member 61 by, for example, laser welding. The first insulating member 10 and the outer insulating member 11 are each preferably made of a resin.

As illustrated in FIGS. 6 and 8, the first insulating member 10 includes a first-insulating-member main portion 10a arranged to face the sealing plate 2. A pair of first side walls 10b are provided at both ends of the first-insulating-member main portion 10a in a long-side direction of the sealing plate 2. A pair of second side walls 10c are provided at both ends of the first-insulating-member main portion 10a in a short-side direction of the sealing plate 2. The second terminal-receiving hole 10d is formed in the first-insulating-member main portion 10a. First connecting portions 10e are provided on the outer surfaces of the second side walls 10c. The first connecting portions 10e are preferably provided at the centers of the second side walls 10c in the long-side direction of the sealing plate 2. Second connecting portions 10f are also provided on the outer surfaces of the second side walls 10c. The second connecting portions 10f are preferably provided at ends of the second side walls 10c in the long-side direction of the sealing plate 2. A first groove 10x is formed in a surface of the first-insulating-member main portion 10a that faces the sealing plate 2. A second groove 10y is formed in a surface of the first-insulating-member main portion 10a that faces the conductive member 61. The second groove 10y is disposed outside the first groove 10x. The surface of the first-insulating-member main portion 10a that faces the sealing plate 2 has recesses 10g at four corners thereof.

As illustrated in FIGS. 6 and 8, the conductive member 61 includes a conductive-member base portion 61a arranged to face the first-insulating-member main portion 10a and a tubular portion 61b that extends toward the electrode assembly 3 from an edge portion of the conductive-member base portion 61a. The cross sectional shape of the tubular portion 61b along a plane parallel to the sealing plate 2 may be either circular or polygonal. The tubular portion 61b has a flange 61d at an end thereof adjacent to the electrode assembly 3. A conductive-member opening portion 61f is provided at the end of the tubular portion 61b that is adjacent to the electrode assembly 3. A pressing projection 61e is provided on a surface of the conductive-member base portion 61a that faces the first insulating member 10. The pressing projection 61e presses the first insulating member 10 against the sealing plate 2. The pressing projection 61e is preferably provided at or near an edge portion around the third terminal-receiving hole 61c.

Next, the deformation plate 62 is placed to cover the conductive-member opening portion 61f of the conductive member 61, and is welded to the conductive member 61 at the peripheral edge thereof by, for example, laser welding. Thus, the conductive-member opening portion 61f of the conductive member 61 is sealed by the deformation plate 62. The conductive member 61 and the deformation plate 62 are each preferably made of a metal, more preferably aluminum or an aluminum alloy.

Figure 9:
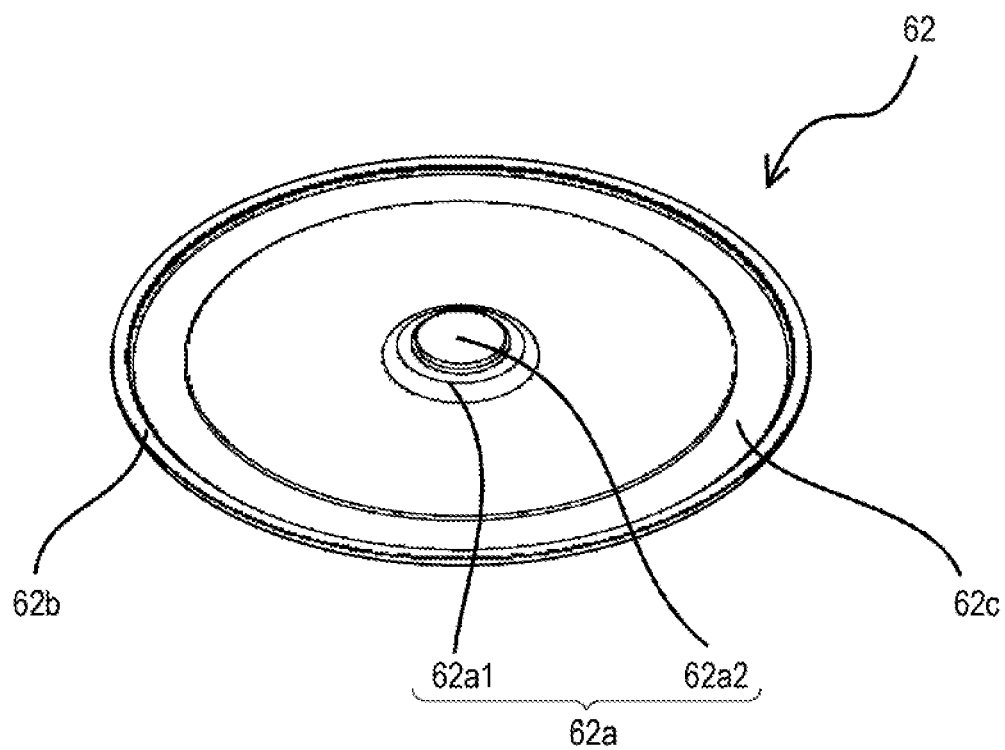
FIG. 9 is a perspective view of a deformation plate.

FIG. 9 is a perspective view of the deformation plate 62. In FIG. 9, the electrode assembly 3 is at the upper side and the sealing plate 2 is at the lower side. As illustrated in FIG. 9, the deformation plate 62 includes a stepped projection 62a that projects toward the electrode assembly 3 at the center thereof. The stepped projection 62a includes a first projecting portion 62a1 and a second projecting portion 62a2 that has an outer diameter less than that of the first projecting portion 62a1 and that projects toward the electrode assembly 3 from the first projecting portion 62a1. The deformation plate 62 has an annular rib 62b that projects toward the electrode assembly 3 at the peripheral edge thereof. An annular thin portion 62c having an annular shape is provided on a surface of the deformation plate 62 that faces the electrode assembly 3. The deformation plate 62 may have any shape as long as the deformation plate 62 is capable of sealing the conductive-member opening portion 61f of the conductive member 61.

A method for fixing the second insulating member 63 and the first positive-electrode current collector 6a will now be described with reference to FIG. 10. In FIG. 10, surfaces that face the electrode assembly 3 in the rectangular secondary battery 20 are at the upper side, and surfaces that face the sealing plate 2 are at the lower side.

Figure 10A:
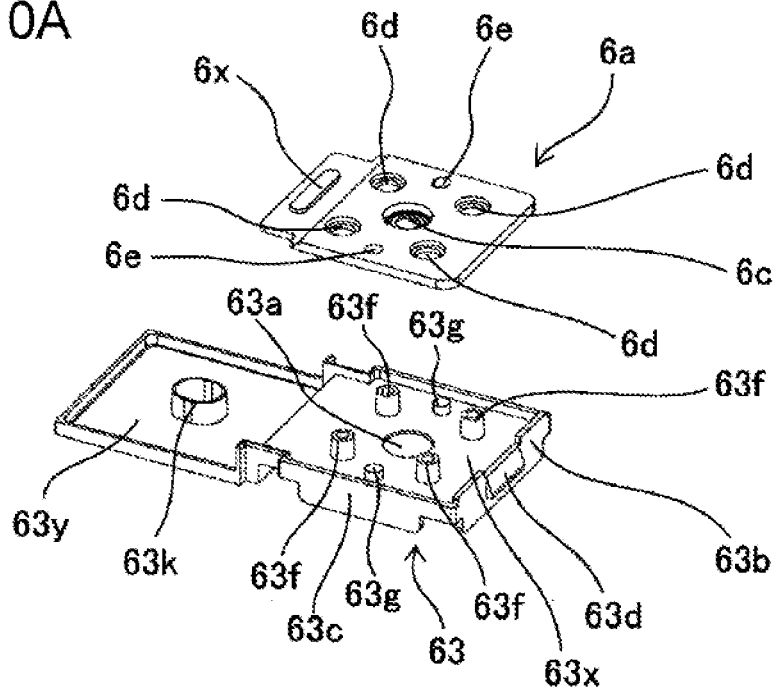
FIG. 10A is a perspective view of a first positive-electrode current collector and a second insulating member before assembly.

As illustrated in FIG. 10A, the first positive-electrode current collector 6a has a connection hole 6c. An edge portion around the connection hole 6c is connected to the deformation plate 62 by welding. The first positive-electrode current collector 6a also has four fixing holes 6d around the connection hole 6c. Although the number of fixing holes 6d may instead be one, two or more fixing holes 6d are preferably provided. The first positive-electrode current collector 6a also has displacement prevention holes 6e around the connection hole 6c. Although the number of displacement prevention holes 6e may be one, at least two displacement prevention holes 6e are preferably provided. The displacement prevention holes 6e are preferably disposed between the fixing holes 6d. Each fixing hole 6d preferably includes a small diameter portion 6d1 and a large diameter portion 6d2 having an inner diameter greater than that of the small diameter portion 6d1. The large diameter portion 6d2 is preferably closer to the electrode assembly 3 than the small diameter portion 6d1 is.

As illustrated in FIGS. 8 and 10A, the second insulating member 63 includes an insulating-member first region 63x arranged to face the deformation plate 62, an insulating-member second region 63y arranged to face the sealing plate 2, and an insulating-member third region 63z that connects the insulating-member first region 63x and the insulating-member second region 63y to each other. The insulating-member first region 63x has an insulating-member first opening 63a at the center thereof. A third wall portion 63b is provided at an end of the insulating-member first region 63x in the long-side direction of the sealing plate 2. A third connecting portion 63d is provided on the third wall portion 63b. Fourth wall portions 63c are provided at both ends of the insulating-member first region 63x in the short-side direction of the sealing plate 2. Fourth connecting portions 63e are provided on the fourth wall portions 63c. In addition, four fixing projections 63f are provided on a surface of the insulating-member first region 63x that faces the electrode assembly 3. In addition, two displacement prevention projections 63g are also provided. Four lug portions 63h are provided on a surface of the insulating-member first region 63x that faces the sealing plate 2. The insulating-member second region 63y is located closer to the sealing plate 2 than the insulating-member first region 63x is. The insulating-member second region 63y has an insulating-member second opening 63i that is located to face the electrolyte introduction hole 15 in the sealing plate 2. An insulating-member annular rib 63k that extends toward the electrode assembly 3 is provided at an edge portion around the insulating-member second opening 63i.

Figure 10B:
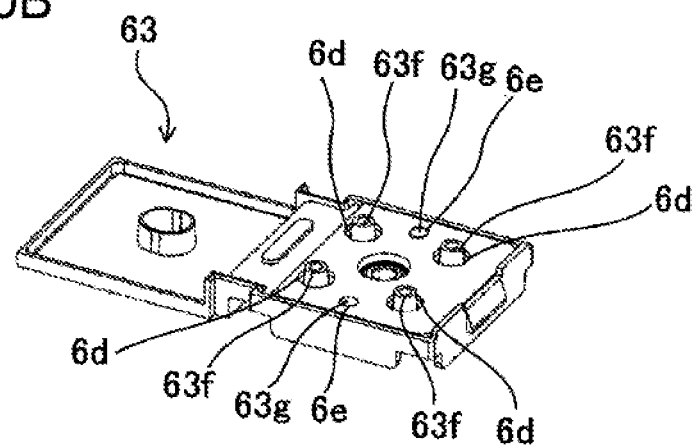
FIG. 10B is a perspective view of the first positive-electrode current collector and the second insulating member after assembly.
Figure 10C:
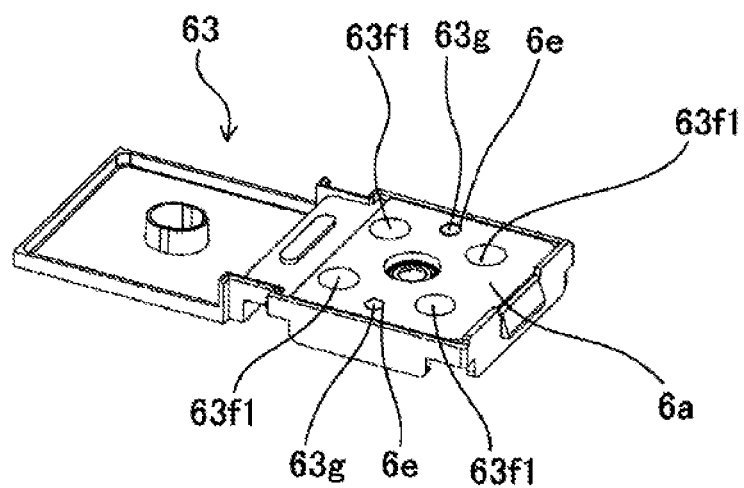
FIG. 10C is a perspective view of the first positive-electrode current collector and the second insulating member that have been fixed together.

As illustrated in FIG. 10B, the first positive-electrode current collector 6a is placed on the second insulating member 63 such that the fixing projections 63f of the second insulating member 63 are inserted in the fixing holes 6d in the first positive-electrode current collector 6a and that the displacement prevention projections 63g of the second insulating member 63 are inserted in the displacement prevention holes 6e in the first positive-electrode current collector 6a. Then, end portions of the fixing projections 63f of the second insulating member 63 are deformed by, for example, heat crimping. Thus, as illustrated in FIGS. 8C and 10C, large-diameter portions 63f1 are formed at the ends of the fixing projections 63f of the second insulating member 63, and the second insulating member 63 and the first positive-electrode current collector 6a are fixed together.

As illustrated in FIG. 8C, the large-diameter portions 63f1 formed at the ends of the fixing projections 63f of the second insulating member 63 are preferably disposed in the large diameter portions 6d2 of the fixing holes 6d.

Unlike the fixing projections 63f, the displacement prevention projections 63g of the second insulating member 63 are not subjected to heat crimping.

The outer diameter of the fixing projections 63f is preferably greater than the outer diameter of the displacement prevention projections 63g. The inner diameter of the small diameter portions 6d1 of the fixing holes 6d in the first positive-electrode current collector 6a is preferably greater than the inner diameter of the displacement prevention holes 6e in the first positive-electrode current collector 6a.

Next, as illustrated in FIGS. 8A to 8C, the second insulating member 63 to which the first positive-electrode current collector 6a is fixed is connected to the first insulating member 10 and the conductive member 61.

As illustrated in FIG. 8B, the fourth connecting portions 63e of the second insulating member 63 are connected to the first connecting portions 10e of the first insulating member 10. In addition, as illustrated in FIG. 8C, the lug portions 63h of the second insulating member 63 are connected to the flange 61d of the conductive member 61. Thus, the second insulating member 63 is connected to the first insulating member 10 and the conductive member 61. The second insulating member 63 is not necessarily connected to both the first insulating member 10 and the conductive member 61. The second insulating member 63 is preferably connected to at least one of the first insulating member 10 and the conductive member 61. Thus, even when the rectangular secondary battery 20 is strongly impacted or vibrated, load applied to weak portions of the first positive-electrode current collector 6a can be reduced. Accordingly, the risk of damage or breakage of the weak portions of the first positive-electrode current collector 6a can be reduced.

Figure 11:
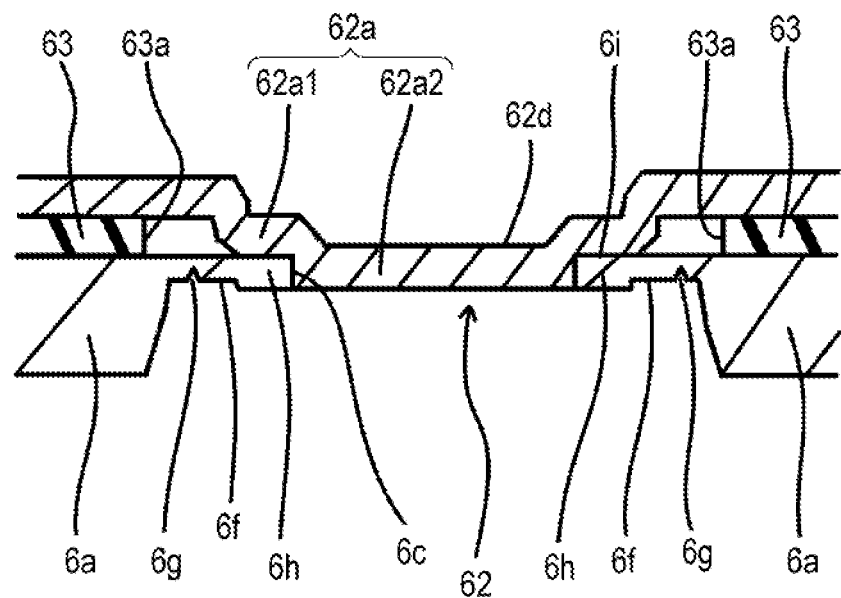
FIG. 11 is an enlarged view of a part of FIG. 8A including a connecting portion between the deformation plate and the first positive-electrode current collector.

The deformation plate 62 is connected to the first positive-electrode current collector 6a by welding. FIG. 11 is an enlarged view of a part of FIG. 8A including the connecting portion between the deformation plate 62 and the first positive-electrode current collector 6a. As illustrated in FIG. 11, the second projecting portion 62a2 of the deformation plate 62 is placed in the connection hole 6c in the first positive-electrode current collector 6a. Then, the second projecting portion 62a2 of the deformation plate 62 and the edge portion around the connection hole 6c in the first positive-electrode current collector 6a are welded and connected together by, for example, laser welding. The connecting portion between the deformation plate 62 and the first positive-electrode current collector 6a is formed at a position corresponding to the position of the insulating-member first opening 63a in the second insulating member 63.

The first positive-electrode current collector 6a has a thin portion 6f in a region around the connection hole 6c. The thin portion 6f has an annular notch 6g that surrounds the connection hole 6c. An annular connection rib 6h is formed along the edge portion around the connection hole 6c. The connection rib 6h is connected to the deformation plate 62 by welding. The first positive-electrode current collector 6a and the deformation plate 62 may be welded either in an annular region over the entire circumference around the connection hole 6c or in a non-annular region having unwelded portions. The first positive-electrode current collector 6a and the deformation plate 62 may be welded at multiple locations that are separated from each other along the edge portion around the connection hole 6c.

The operation of the current interruption mechanism 60 will now be described. When the pressure in the battery case 100 increases, the deformation plate 62 is deformed such that a central portion thereof moves toward the sealing plate 2. When the pressure in the battery case 100 reaches or exceeds a predetermined value, the notch 6g in the thin portion 6f of the first positive-electrode current collector 6a breaks due to the deformation of the deformation plate 62. Accordingly, the conductive path from the positive electrode plates 4 to the positive electrode terminal 7 is broken. Thus, the current interruption mechanism 60 includes the first positive-electrode current collector 6a, the deformation plate 62, and the conductive member 61. When the rectangular secondary battery 20 is overcharged and the pressure in the battery case 100 is increased, the current interruption mechanism 60 is activated and breaks the conductive path from the positive electrode plates 4 to the positive electrode terminal 7. As a result, further overcharging is prevented. The activation pressure at which the current interruption mechanism 60 is activated may be determined as appropriate.

A leakage test for a welding portion between the conductive member 61 and the deformation plate 62 may be performed before welding the deformation plate 62 and the first positive-electrode current collector 6a together by introducing gas into the space inside the conductive member 61 through a terminal through hole 7c formed in the positive electrode terminal 7. The terminal through hole 7c is sealed by a terminal sealing member 7x. The terminal sealing member 7x preferably includes a metal member 7y and a rubber member 7z.

Figure 12:
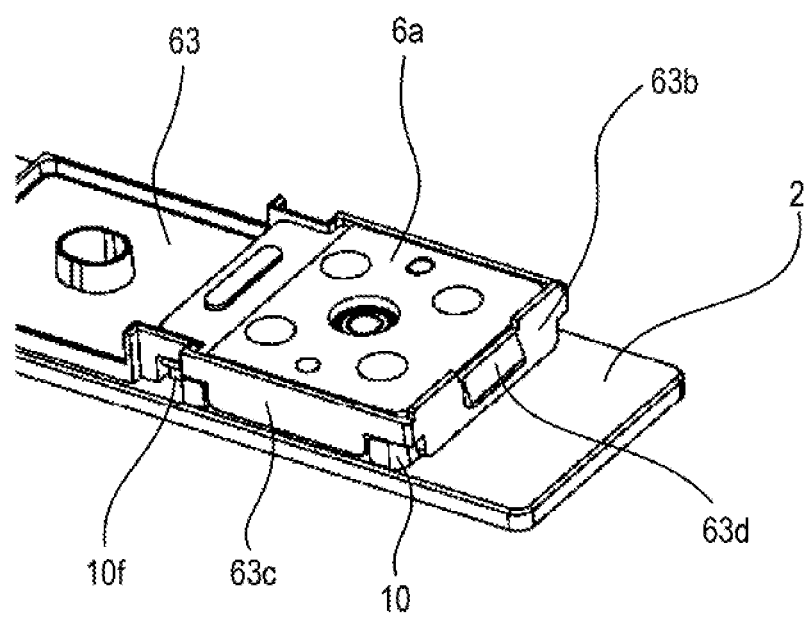
FIG. 12 is a perspective view of the sealing plate to which components are attached.

FIG. 12 is a perspective view of the sealing plate 2 to which the first insulating member 10, the conductive member 61, the deformation plate 62, the second insulating member 63, and the first positive-electrode current collector 6a are attached. As illustrated in FIG. 12, the third connecting portion 63d is provided at an end of the second insulating member 63 in the long-side direction of the sealing plate 2. In addition, the second connecting portions 10f are provided at both ends of the first insulating member 10 in the short-side direction of the short-side direction.

[Attachment of Components to Sealing Plate (Negative Electrode Side)]

A method for attaching the negative electrode terminal 9 and the first negative-electrode current collector 8a to the sealing plate 2 will now be described with reference to FIGS. 2 and 13. The outer insulating member 13 is placed on a surface of the sealing plate 2 that faces the outside of the battery in a region including a negative-electrode-terminal attachment hole 2b. An inner insulating member 12 and the first negative-electrode current collector 8a are placed on a surface of the sealing plate 2 that faces the inside of the battery in the region including the negative-electrode-terminal attachment hole 2b. Next, the negative electrode terminal 9 is inserted through a through hole in the outer insulating member 13, the negative-electrode-terminal attachment hole 2b in the sealing plate 2, a through hole in the inner insulating member 12, and a through hole in the first negative-electrode current collector 8a. Then, an end portion of the negative electrode terminal 9 is crimped onto the first negative-electrode current collector 8a. Thus, the outer insulating member 13, the sealing plate 2, the inner insulating member 12, and the first negative-electrode current collector 8a are fixed together. The crimped portion of the negative electrode terminal 9 is preferably welded and connected to the first negative-electrode current collector 8a by, for example, laser welding. The inner insulating member 12 and the outer insulating member 13 are each preferably made of a resin.

[Connection between Current Collectors and Tabs]

Figure 14:
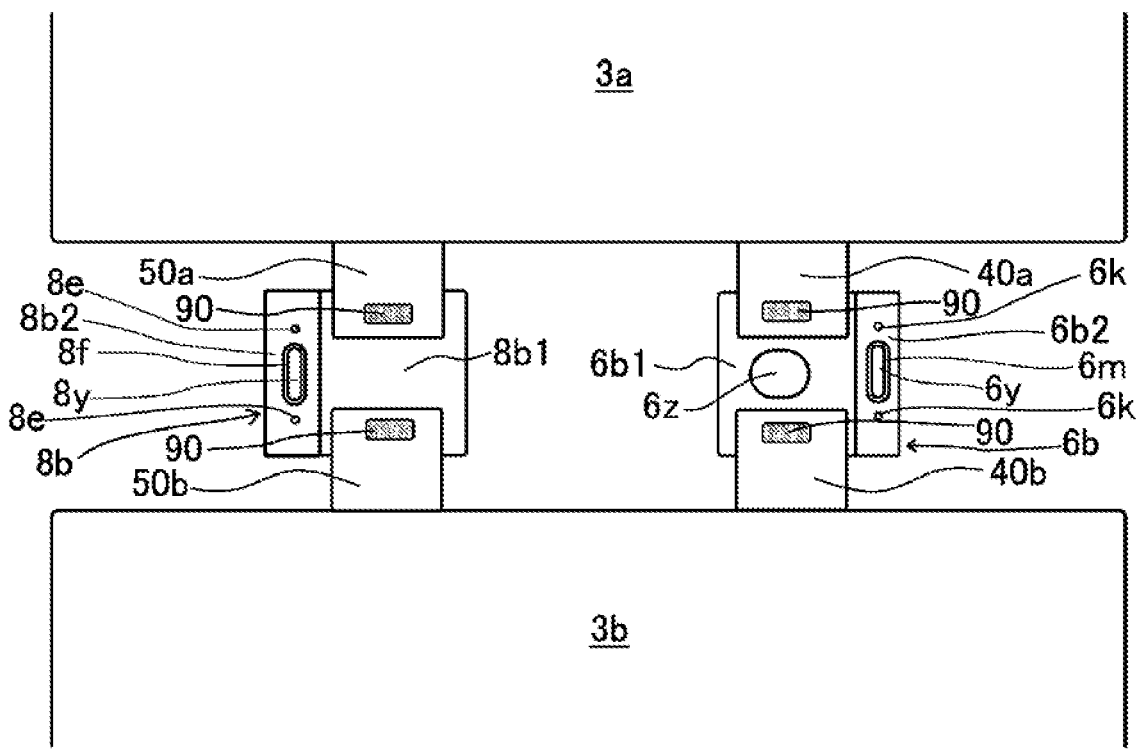
FIG. 14 illustrates a method for attaching tabs to current collecting members.

FIG. 14 illustrates a method for connecting the positive-electrode tabs 40 to the second positive-electrode current collector 6b and the negative-electrode tabs 50 to the second negative-electrode current collector 8b. Two electrode assembly elements are produced by the above-described method, and are referred to as a first electrode assembly element 3a and a second electrode assembly element 3b. The first electrode assembly element 3a and the second electrode assembly element 3b may have completely the same structure or different structures. The positive-electrode tabs 40 of the first electrode assembly element 3a form a first positive-electrode tab group 40a. The negative-electrode tabs 50 of the first electrode assembly element 3a form a first negative-electrode tab group 50a. The positive-electrode tabs 40 of the second electrode assembly element 3b form a second positive-electrode tab group 40b. The negative-electrode tabs 50 of the second electrode assembly element 3b form a second negative-electrode tab group 50b.

The second positive-electrode current collector 6b and the second negative-electrode current collector 8b are disposed between the first electrode assembly element 3a and the second electrode assembly element 3b. The first positive-electrode tab group 40a, which is formed of the positive-electrode tabs 40 in a stacked state that project from the first electrode assembly element 3a, is placed on the second positive-electrode current collector 6b, and the first negative-electrode tab group 50a, which is formed of the negative-electrode tabs 50 in a stacked state that project from the first electrode assembly element 3a, is placed on the second negative-electrode current collector 8b. The second positive-electrode tab group 40b, which is formed of the positive-electrode tabs 40 in a stacked state that project from the second electrode assembly element 3b, is placed on the second positive-electrode current collector 6b, and the second negative-electrode tab group 50b, which is formed of the negative-electrode tabs 50 in a stacked state that project from the second electrode assembly element 3b, is placed on the second negative-electrode current collector 8b. The first positive-electrode tab group 40a and the second positive-electrode tab group 40b are connected to the second positive-electrode current collector 6b by welding to form welded connecting portions 90. The first negative-electrode tab group 50a and the second negative-electrode tab group 50b are connected to the second negative-electrode current collector 8b by welding to form welded connecting portions 90. The welding and connecting process may be performed as described below.

The tabs in a stacked state (the first positive-electrode tab group 40a, the second positive-electrode tab group 40b, the first negative-electrode tab group 50a, and the second negative-electrode tab group 50b) and the current collectors (the second positive-electrode current collector 6b and the second negative-electrode current collector 8b) are clamped by a pair of welding jigs from above and below and are welded together. The welding method is preferably ultrasonic welding or resistance welding. The pair of welding jigs are a pair of resistance welding electrodes for resistance welding, and are a horn and an anvil for ultrasonic welding. The tabs (the first positive-electrode tab group 40a, the second positive-electrode tab group 40b, the first negative-electrode tab group 50a, and the second negative-electrode tab group 50b) and the current collectors (the second positive-electrode current collector 6*b* and the second negative-electrode current collector 8*b*) may instead be connected by laser welding.

As illustrated in FIG. 14, the second positive-electrode current collector 6*b* includes a current-collector first region 6*b*1 and a current-collector second region 6*b*2. The positive-electrode tabs 40 are connected to the current-collector first region 6*b*1. A current-collector second opening 6*z* is formed in the current-collector first region 6*b*1. The current-collector first region 6*b*1 and the current-collector second region 6*b*2 are connected to each other by a current-collector third region 6*b*3. When the second positive-electrode current collector 6*b* is connected to the first positive-electrode current collector 6*a*, the current-collector second opening 6*z* is at a position corresponding to the position of the electrolyte introduction hole 15 in the sealing plate 2. A current-collector first opening 6*y* is formed in the current-collector second region 6*b*2. A current-collector first recess 6*m* is formed around the current-collector first opening 6*y*. Target holes 6*k* are formed on both sides of the current-collector first opening 6*y* in the short-side direction of the sealing plate 2.

As illustrated in FIG. 14, the second negative-electrode current collector 8*b* includes a current-collector first region 8*b*1 and a current-collector second region 8*b*2. The negative-electrode tabs 50 are connected to the current-collector first region 8*b*1. A current-collector first opening 8*y* is formed in the current-collector second region 8*b*2. A current-collector first recess 8*f* is formed around the current-collector first opening 8*y*. Target holes 8*e* are formed on both sides of the current-collector first opening 8*y* in the short-side direction of the sealing plate 2.

[Connection between First Positive-Electrode Current Collector and Second Positive-Electrode Current Collector]

As illustrated in FIGS. 2, 7, and 8 and other drawings, the second positive-electrode current collector 6*b* is placed on the second insulating member 63 such that a current-collector projection 6*x* on the first positive-electrode current collector 6*a* is inserted in the current-collector first opening 6*y* in the second positive-electrode current collector 6*b*. Then, the current-collector projection 6*x* on the first positive-electrode current collector 6*a* is welded to an edge portion around the current-collector first opening 6*y* in the second positive-electrode current collector 6*b* by irradiation with an energy ray, such as a laser beam. Thus, the first positive-electrode current collector 6*a* and the second positive-electrode current collector 6*b* are connected together. The first positive-electrode current collector 6*a* and the second positive-electrode current collector 6*b* are preferably welded together in the current-collector first recess 6*m*.

As illustrated in FIGS. 2 and 8, the distance between the sealing plate 2 and the current-collector first region 6*b*1 is less than the distance between the sealing plate 2 and the current-collector second region 6*b*2 in the direction perpendicular to the sealing plate 2. According to this structure, the space occupied by the current collecting unit can be reduced, and the volume energy density of the rectangular secondary battery can be increased.

When the first positive-electrode current collector 6*a* and the second positive-electrode current collector 6*b* are welded together by irradiation with an energy ray, such as a laser beam, the target holes 6*k* are preferably used as image correction targets.

As illustrated in FIG. 8A, the first positive-electrode current collector 6*a* has a current-collector second recess 6*w* in a surface thereof that faces the second insulating member 63 at a position behind the current-collector projection 6*x*.

Accordingly, a larger welded connecting portion can be more easily formed between the first positive-electrode current collector 6*a* and the second positive-electrode current collector 6*b*. In addition, the current-collector second recess 6*w* reduces the risk that the second insulating member 63 will be damaged by heat generated in the welding process when the first positive-electrode current collector 6*a* and the second positive-electrode current collector 6*b* are connected together by welding.

[Connection Between First Negative-Electrode Current Collector and Second Negative-Electrode Current Collector]

Figure 13:
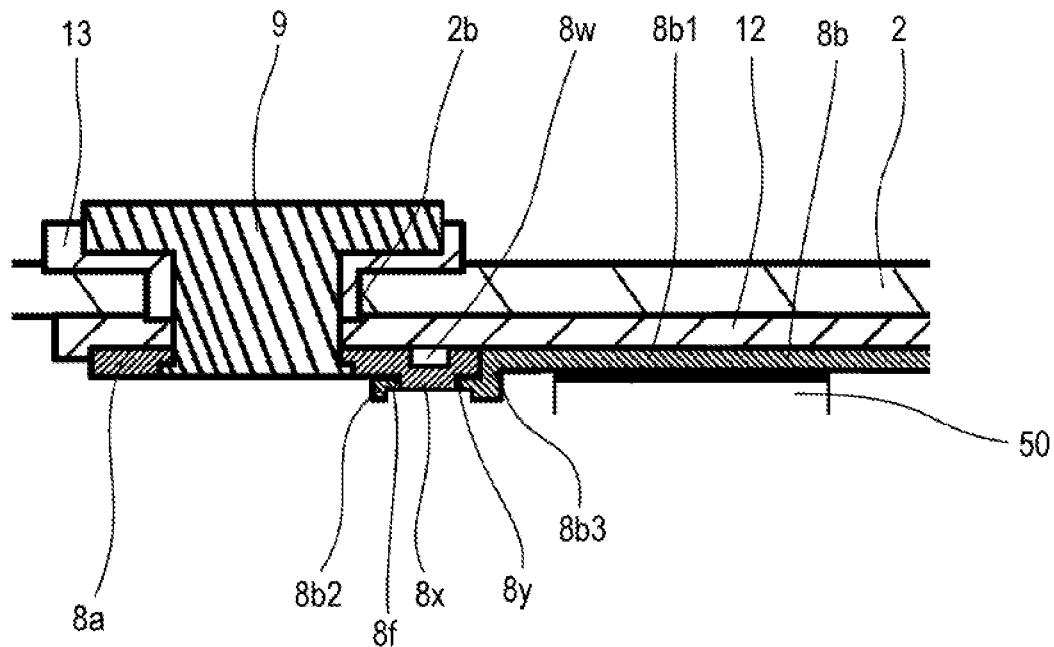
FIG. 13 is a sectional view of a part including a negative electrode terminal taken in a long-side direction of the sealing plate.

As illustrated in FIG. 13, the second negative-electrode current collector 8*b* includes the current-collector first region 8*b*1 and the current-collector second region 8*b*2. The negative-electrode tabs 50 are connected to the current-collector first region 8*b*1. The current-collector first opening 8*y* is formed in the current-collector second region 8*b*2. The current-collector first region 8*b*1 and the current-collector second region 8*b*2 are connected to each other by a current-collector third region 8*b*3.

As illustrated in FIG. 13, the second negative-electrode current collector 8*b* is placed on the inner insulating member 12 such that a current-collector projection 8*x* on the first negative-electrode current collector 8*a* is inserted in the current-collector first opening 8*y* in the second negative-electrode current collector 8*b*. Then, the current-collector projection 8*x* on the first negative-electrode current collector 8*a* is welded to an edge portion around the current-collector first opening 8*y* in the second negative-electrode current collector 8*b* by irradiation with an energy ray, such as a laser beam. Thus, the first negative-electrode current collector 8*a* and the second negative-electrode current collector 8*b* are connected together. The first negative-electrode current collector 8*a* and the second negative-electrode current collector 8*b* are preferably welded together in the current-collector first recess 8*f*. Similar to the second positive-electrode current collector 6*b*, the second negative-electrode current collector 8*b* has the target holes 8*e*. The distance between the sealing plate 2 and the current-collector first region 8*b*1 is less than the distance between the sealing plate 2 and the current-collector second region 8*b*2 in the direction perpendicular to the sealing plate 2. The first negative-electrode current collector 8*a* may be omitted, and the second negative-electrode current collector 8*b* may be connected to the negative electrode terminal 9.

As illustrated in FIG. 13, the first negative-electrode current collector 8*a* has a current-collector second recess 8*w* in a surface thereof that faces the inner insulating member 12 at a position behind the current-collector projection 8*x*. Accordingly, a larger welded connecting portion can be more easily formed between the first negative-electrode current collector 8*a* and the second negative-electrode current collector 8*b*. In addition, the current-collector second recess 8*w* reduces the risk that the inner insulating member 12 will be damaged by heat generated in the welding process when the first negative-electrode current collector 8*a* and the second negative-electrode current collector 8*b* are connected together by welding.

The current-collector projection 6*x* and the current-collector projection 8*x* are preferably not circular, and are preferably rectangular, elliptical, or track-shaped in plan view.

[Attachment of Cover]

Figure 15:
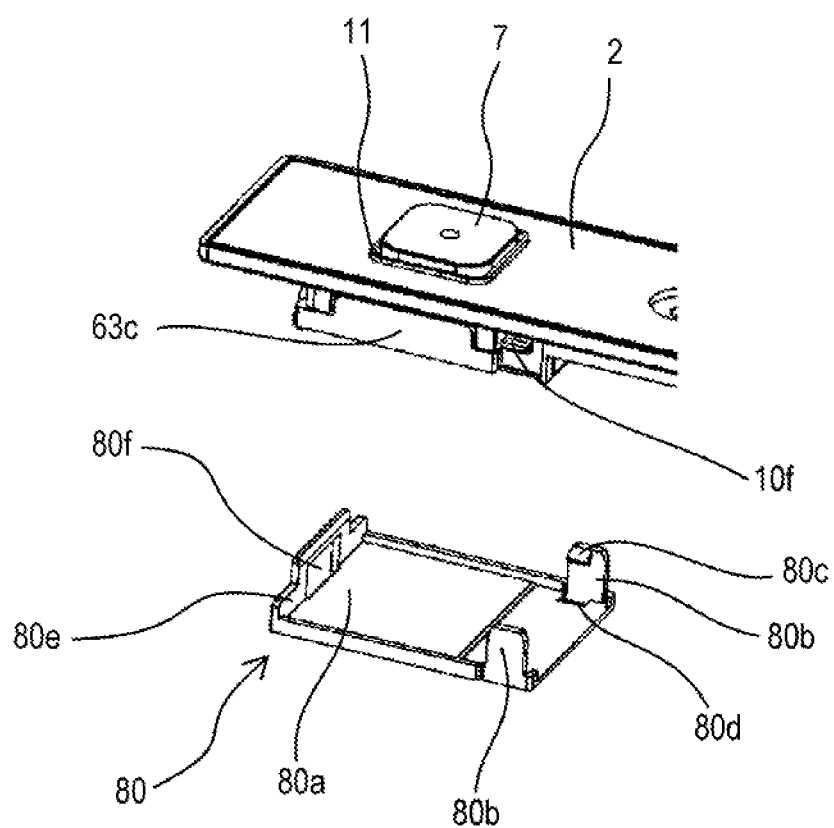
FIG. 15 is a perspective view of the sealing plate and a cover.

FIG. 15 is a perspective view of the sealing plate 2 to which the components are attached and a cover 80. The positive-electrode tabs 40 are not illustrated in FIG. 15. The cover 80 includes a cover main portion 80*a* arranged to face the first positive-electrode current collector 6a and a pair of arm portions 80b that extend toward the sealing plate 2 from both ends of the cover main portion 80a in the short-side direction of the sealing plate 2. The cover 80 also includes a cover wall portion 80e that extends toward the sealing plate 2 from an end of the cover main portion 80a in the long-side direction of the sealing plate 2. Connecting projections 80c are provided on inner surfaces of the arm portions 80b. The cover main portion 80a has base openings 80d at positions near the base ends of the arm portions 80b. The cover wall portion 80e has a wall portion opening 80f.

Figure 16A:
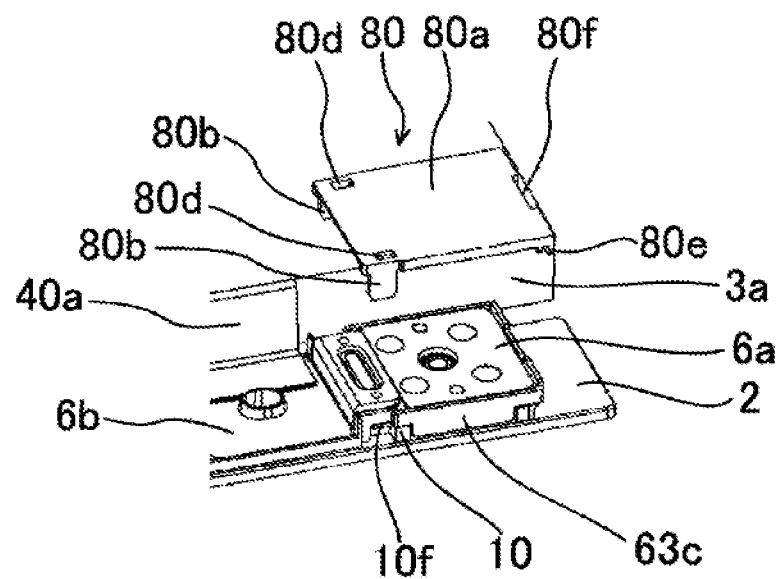
FIG. 16A illustrates a state before the cover is attached to the first insulating member and the second insulating member.
Figure 16B:
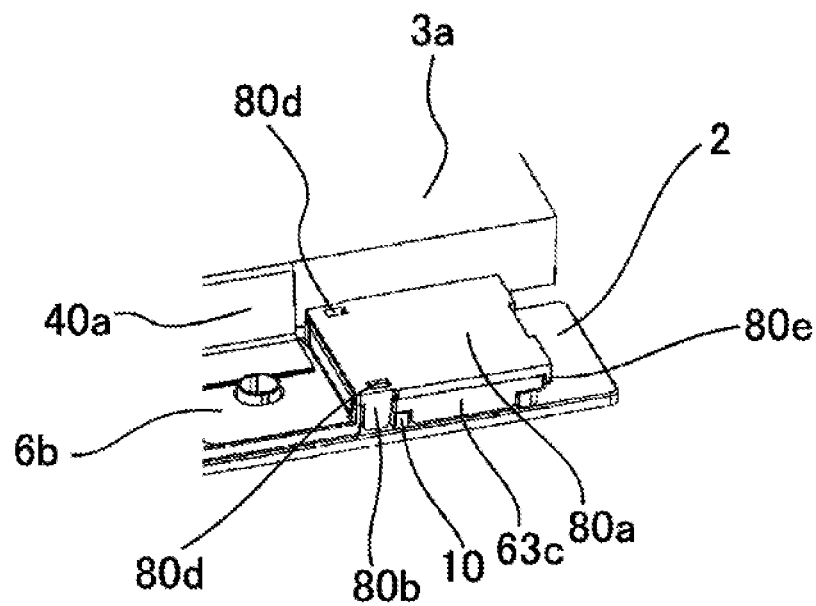
FIG. 16B illustrates a state after the cover is attached to the first insulating member and the second insulating member.

As illustrated in FIGS. 16A and 16B, the cover 80 is connected to the first insulating member 10 and the second insulating member 63 so that the cover main portion 80a of the cover 80 faces the first positive-electrode current collector 6a. The connecting projections 80c on the pair of arm portions 80b of the cover 80 are connected to the second connecting portions 10f of the first insulating member 10. The cover wall portion 80e of the cover 80 is connected to the third connecting portion 63d of the second insulating member 63.

Figure 17A:
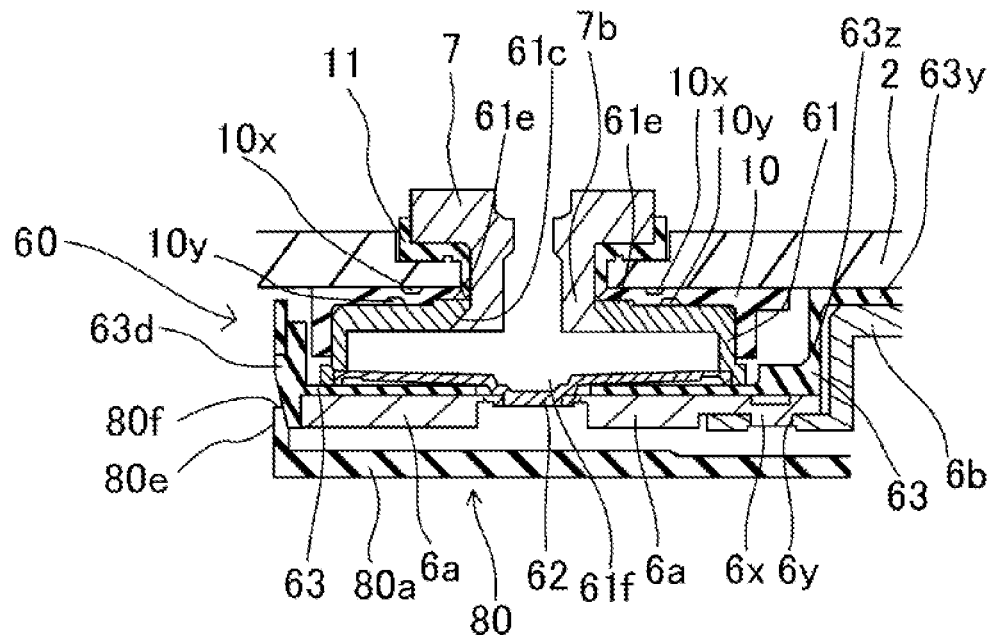
FIG. 17A is a sectional view of a part including the positive electrode terminal after the cover is attached, taken in the long-side direction of the sealing plate.
Figure 17B:
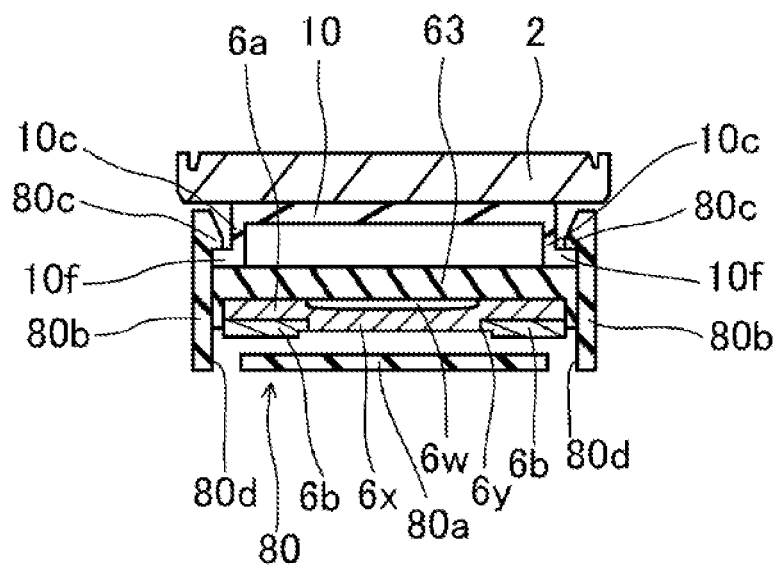
FIG. 17B is a sectional view of a part including a connecting portion between the cover and the first insulating member, taken in a short-side direction of the sealing plate.

As illustrated in FIG. 17A, the third connecting portion 63d is a projection provided on the third wall portion 63b. The third connecting portion 63d is fitted to the wall portion opening 80f in the cover wall portion 80e so that the first insulating member 10 and the cover 80 are connected together. As illustrated in FIG. 17B, the connecting projections 80c on the arm portions 80b of the cover 80 are connected to the second connecting portions 10f of the first insulating member 10 by being engaged therewith.

The cover 80 is preferably made of resin. In addition, the cover 80 is preferably composed of an insulating member.

As illustrated in FIGS. 17A and 17B, a gap is preferably provided between the first positive-electrode current collector 6a and the top surface of the cover main portion 80a of the cover 80. Such a structure allows gas to smoothly flow along the bottom surface of the deformation plate 62, so that the deformation plate 62 is smoothly deformed when the pressure in the battery case 100 reaches or exceeds the predetermined value. However, it is not necessary that the above-described gap be provided.

As illustrated in FIG. 17B, the cover main portion 80a of the cover 80 preferably has the base openings 80d. In such a case, gas smoothly flows along the bottom surface of the deformation plate 62, so that the deformation plate 62 is smoothly deformed when the pressure in the battery case 100 reaches or exceeds the predetermined value. However, it is not necessary that the base openings 80d be provided.

[Production of Electrode Assembly]

The first positive-electrode tab group 40a, the second positive-electrode tab group 40b, the first negative-electrode tab group 50a, and the second negative-electrode tab group 50b are bent so that the top surfaces of the first electrode assembly element 3a and the second electrode assembly element 3b illustrated in FIG. 14 are in contact with each other directly or with another component interposed therebetween. Thus, the first electrode assembly element 3a and the second electrode assembly element 3b are combined together to form a single electrode assembly 3. The first electrode assembly element 3a and the second electrode assembly element 3b are preferably combined together by using a piece of tape or the like. Alternatively, the first electrode assembly element 3a and the second electrode assembly element 3b are preferably combined together by placing the first electrode assembly element 3a and the second electrode assembly element 3b in the insulating sheet 14 formed in a box shape or a bag shape.

[Assembly of Rectangular Secondary Battery]

The electrode assembly 3 attached to the sealing plate 2 is covered with the insulating sheet 14, and is inserted into the rectangular exterior body 1. The insulating sheet 14 is preferably flat sheet shaped, and is folded into a box shape or a bag shape. Then, the sealing plate 2 and the rectangular exterior body 1 are joined together by, for example, laser welding to seal the opening in the rectangular exterior body 1. After that, a nonaqueous electrolyte containing an electrolyte solvent and an electrolyte salt is introduced into the battery case 100 through the electrolyte introduction hole 15 in the sealing plate 2. Then, the electrolyte introduction hole 15 is sealed with the sealing plug 16. Thus, the rectangular secondary battery 20 is produced.

[Regarding Rectangular Secondary Battery 20]

Figure 18:
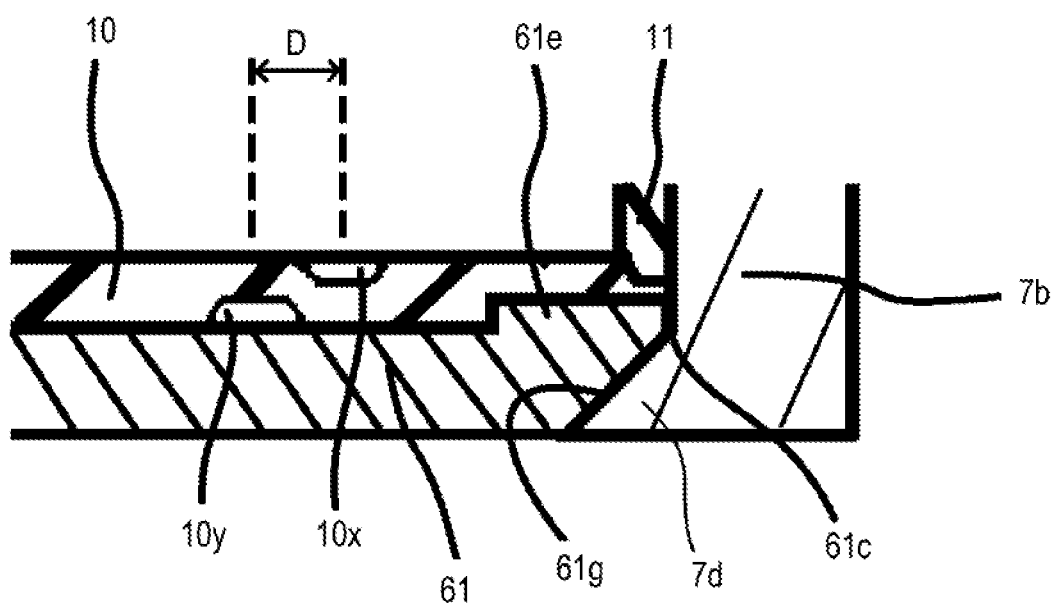
FIG. 18 is an enlarged view of a part of FIG. 8A including a connecting portion between the positive electrode terminal and the conductive member.

As illustrated in FIGS. 8, 17, and 18, the conductive member 61 includes a pressing projection 61e that projects toward the first insulating member 10 in a region where the conductive member 61 faces the first insulating member 10. Accordingly, the pressing projection 61e strongly presses the first insulating member 10 against the sealing plate 2. Therefore, gas around the electrode assembly 3 does not flow through a gap between the sealing plate 2 and the first insulating member 10 or a gap between the first insulating member 10 and the conductive member 61 toward the connecting portion between the conductive member 61 and the positive electrode terminal 7. As a result, gas does not flow into the space defined by the conductive member 61 and the deformation plate 62 through a gap between the conductive member 61 and the positive electrode terminal 7. This ensures reliable activation of the current interruption mechanism 60 when the pressure in the rectangular exterior body 1 increases in case of abnormal operation of the rectangular secondary battery 20. Thus, the reliability of the rectangular secondary battery 20 is increased.

The pressing projection 61e is formed on a surface of the conductive-member base portion 61a of the conductive member 61 that faces the sealing plate 2. When the conductive member 61 and the positive electrode terminal 7 are viewed in the direction perpendicular to the sealing plate 2, the pressing projection 61e preferably overlaps a crimped portion 7d (large diameter portion) of the inserting portion 7b of the positive electrode terminal 7. In addition, the pressing projection 61e is preferably formed along the edge of the third terminal-receiving hole 61c in the conductive member 61. However, the pressing projection 61e may instead be formed at a position separated from the edge of the third terminal-receiving hole 61c in the conductive member 61. The pressing projection 61e preferably has an annular shape in plan view. However, the shape of the pressing projection 61e in plan view is not limited to an annular shape, and may instead be a shape obtained by partially cutting an annular shape. For example, the length of the pressing projection 61e may be 70% or more of that in the case where the pressing projection 61e has an annular shape. When the pressing projection 61e is formed on the conductive member 61, the pressing projection 61e can be easily formed in a desired shape.

When the first insulating member 10 pressed by the pressing projection 61e is deformed to move in the horizontal direction (direction parallel to the sealing plate 2, leftward in FIG. 18), there is a risk that a gap will be formed between the sealing plate 2 and the first insulating member 10 or between the first insulating member 10 and the conductive member 61 due to the deformation of the first insulating member 10. Such a risk can be reduced by forming a groove in a portion of the first insulating member 10 that is disposed between the sealing plate 2 and the conductive member 61 and that is on the outer side of the pressing projection 61e in the radial direction of the second terminal-receiving hole 10d in the first insulating member 10. For example, a first groove 10x is preferably formed in a surface of the first insulating member 10 that faces the sealing plate 2. Also, a second groove 10y is preferably formed in a surface of the first insulating member 10 that faces the conductive member 61 in addition to or in place of the first groove 10x. The first insulating member 10 may have only one of the first groove 10x and the second groove 10y. Alternatively, the first insulating member 10 may have the second groove 10y in the surface thereof facing the sealing plate 2, and the first groove 10x in the surface thereof facing the conductive member 61. The first groove 10x and the second groove 10y are not essential.

The first groove 10x preferably has an annular shape in plan view. The second groove 10y preferably also has an annular shape in plan view. However, the shape of the first groove 10x and the second groove 10y in plan view is not limited to an annular shape, and may instead be a shape obtained by partially cutting an annular shape. For example, the length of the first groove 10x and the second groove 10y may be 70% or more of that in the case where the first groove 10x and the second groove 10y have an annular shape.

When grooves are formed in both surfaces of the first insulating member 10, the grooves are preferably arranged such that one of the grooves is on the outer side the other groove in the radial direction of the second terminal-receiving hole 10d in the first insulating member 10. In other words, when the grooves are formed in both surfaces of the first insulating member 10, the distance from the second terminal-receiving hole 10d in the first insulating member 10 to one of the grooves is preferably greater than the distance from the second terminal-receiving hole 10d in the first insulating member 10 to the other groove.

In addition, the distance between the center of one of the grooves and the center of the other groove in the radial direction of the second terminal-receiving hole 10d in the first insulating member 10 (distance D in FIG. 18) is preferably 0.5 mm to 10 mm, and more preferably 0.5 mm to 5 mm.

For example, the first insulating member 10 is formed such that the second groove 10y is on the outer side of the first groove 10x in the radial direction of the second terminal-receiving hole 10d in the first insulating member 10. Referring to FIG. 18, the distance D between the center of the first groove 10x in the width direction and the center of the second groove 10y in the width direction is preferably 0.5 mm to 10 mm, and more preferably 0.5 mm to 5 mm. The width of the first groove 10x and the second groove 10y (width in the left-right direction in FIG. 18) is preferably 0.5 mm to 2 mm.

Preferably, the first groove 10x and the second groove 10y partially overlap in plan view of the first insulating member 10. However, preferably, the first groove 10x and the second groove 10y do not completely overlap in plan view of the first insulating member 10. According to such a structure, deformation of the first insulating member 10 can be more effectively reduced.

The width of the pressing projection 61e in the radial direction of the third terminal-receiving hole 61c in the conductive member 61 is preferably 5 mm or less, and more preferably 2 mm. The distance between the pressing projection 61e and the first groove 10x in the radial direction of the third terminal-receiving hole 61c in the conductive member 61 is preferably 0.5 mm to 5 mm, more preferably 0.5 mm to 2 mm, and still more preferably 0.5 mm to 1 mm.

The above configuration is particularly effective when the first insulating member 10 is made of a relatively soft material, such as perfluoroalkoxy alkane (PFA) or polytetrafluoroethylene (PTFE).

As illustrated in FIG. 18, an edge portion around the third terminal-receiving hole 61c in the conductive member 61 preferably includes a tapered portion 61g on a side thereof facing the electrode assembly 3. According to such a structure, a gap is not easily formed between the positive electrode terminal 7 and the conductive member 61, and the risk that gas will flow through the gap between the positive electrode terminal 7 and the conductive member 61 can be effectively reduced.

The conductive member 61 is preferably made of aluminum or an aluminum alloy. The positive electrode terminal 7 is also preferably made of aluminum or an aluminum alloy.

As illustrated in FIG. 10, the second insulating member 63 and the first positive-electrode current collector 6a are fixed together by inserting the fixing projections 63f of the second insulating member 63 into the fixing holes 6d in the first positive-electrode current collector 6a and forming the large-diameter portions 63f1 by increasing the diameter of the end portions of the fixing projections 63f. According to this structure, load applied to weak portions of the first positive-electrode current collector 6a, such as the thin portion 6f and the notch 6g, can be reduced when the rectangular secondary battery 20 is strongly impacted or vibrated. The second insulating member 63 is preferably connected to at least one of the first insulating member 10 and the conductive member 61.

In the case where the second insulating member 63 is made of resin, there is a risk that gaps will be formed between side surfaces of the fixing projections 63f of the second insulating member 63 and the inner surfaces of the fixing holes 6d in the first positive-electrode current collector 6a due to distortion or contraction of the fixing projections 63f when the diameter of the end portions of the fixing projections 63f is increased after inserting the fixing projections 63f into the fixing holes 6d. Such gaps may cause a displacement of the first positive-electrode current collector 6a with respect to the second insulating member 63 in a direction parallel to the sealing plate 2 when the rectangular secondary battery 20 is strongly impacted or vibrated. In the case where the end portions of the fixing projections 63f are increased in diameter while being heated, the above-described gaps are easily formed due to thermal contraction of portions of the fixing projections 63f in the fixing holes 6d.

The rectangular secondary battery 20 is configured such that the second insulating member 63 includes the displacement prevention projections 63g and that the displacement prevention projections 63g are disposed in the displacement prevention holes 6e in the first positive-electrode current collector 6a. Unlike the fixing projections 63f, the displacement prevention projections 63g are not increased in diameter. Therefore, even when gaps are formed between the fixing projections 63f and the fixing holes 6d, since the displacement prevention projections 63g are fitted to the displacement prevention holes 6e, displacement of the first positive-electrode current collector 6a with respect to the second insulating member 63 can be effectively reduced.

Preferably, a plurality of fixing projections 63f are provided around the connecting portion between the deformation plate 62 and the first positive-electrode current collector 6a. In particular, the fixing projections 63f are preferably provided at four or more locations. The displacement prevention projections 63g are preferably provided on both sides of the connecting portion between the deformation plate 62 and the first positive-electrode current collector 6a. In addition, the displacement prevention projections 63g are preferably disposed between the fixing projections 63f.

The diameter of the fixing projections 63f is preferably greater than the diameter of the displacement prevention projections 63g.

When the displacement prevention holes 6e are provided at two locations, the inner diameter of one displacement prevention hole 6e may be greater than that of the other. In addition, when the displacement prevention projections 63g are provided at two locations, the outer diameter of one displacement prevention projection 63g may be greater than that of the other.

The ratio of the outer diameter of the displacement prevention projections 63g to the inner diameter of the displacement prevention holes 6e is preferably 0.95 to 1. The difference between the inner diameter of the displacement prevention holes 6e and the outer diameter of the displacement prevention projections 63g is preferably less than or equal to 0.1 mm.

When a plurality of fitting portions at which the displacement prevention projections 63g are fitted to the displacement prevention holes 6e are provided, the difference between the inner diameter of the displacement prevention hole 6e and the outer diameter of the displacement prevention projection 63g at one of the fitting portions may differ from the difference between the inner diameter of the displacement prevention hole 6e and the outer diameter of the displacement prevention projection 63g at another one of the fitting portions.

Preferably, each displacement prevention hole 6e is not a notch formed in an edge portion of the first positive-electrode current collector 6a, but is formed such that an edge portion therearound has an annular shape. In other words, the side surface of each displacement prevention projection 63g is preferably surrounded by the first positive-electrode current collector 6a over the entire circumference thereof. In such a case, displacement can be more effectively reduced.

Preferably, the displacement prevention holes 6e are provided on both sides of the connecting portion between the deformation plate 62 and the first positive-electrode current collector 6a in the short-side direction of the sealing plate 2. In addition, preferably, the connecting portion between the deformation plate 62 and the first positive-electrode current collector 6a is disposed between two displacement prevention holes 6e on a straight line connecting the two displacement prevention holes 6e. Accordingly, load applied to the connecting portion between the deformation plate 62 and the first positive-electrode current collector 6a, the thin portion 6f, and the notch 6g can be reliably reduced.

The end portions of the fixing projections 63f preferably have recesses before the diameter thereof is increased. In such a case, load applied to the base ends of the fixing projections 63f when the end portions of the fixing projections 63f are increased in diameter can be reduced.

As illustrated in FIGS. 16 and 17, the cover 80 is disposed between the first positive-electrode current collector 6a and the electrode assembly 3. According to this structure, even when the rectangular secondary battery 20 is strongly impacted or vibrated and the electrode assembly 3 is moved toward the sealing plate 2, the electrode assembly 3 can be prevented from coming into contact with the first positive-electrode current collector 6a and causing damage or breakage of, for example, the weak portions of the first positive-electrode current collector 6a, such as the thin portion 6f and the notch 6g, and the connecting portion between the deformation plate 62 and the first positive-electrode current collector 6a. Accordingly, a secondary battery with increased reliability can be provided. The cover 80 is preferably made of resin. In addition, the cover 80 is preferably electrically insulative.

The cover 80 is preferably formed as a component separate from the first insulating member 10 and the second insulating member 63. When, for example, the cover 80 is a component separate from the first insulating member 10 and the second insulating member 63, the secondary battery can be easily assembled. In addition, when the cover 80 and the second insulating member 63 are separate components, a projection may be formed on a surface of the second insulating member 63 that faces the first positive-electrode current collector 6a, and the second insulating member 63 and the first positive-electrode current collector 6a can be strongly connected together by using the projection.

A gap is preferably provided between the first positive-electrode current collector 6a and the cover main portion 80a of the cover 80. The distance between a surface of the first positive-electrode current collector 6a that faces the electrode assembly and a surface of the cover main portion 80a that faces the sealing plate is preferably 0.1 mm to 5 mm, and more preferably 0.5 to 2 mm.

Preferably, a portion of the cover 80 that extends toward the sealing plate 2 from the cover main portion 80a is connected to at least one of the first insulating member 10 and the second insulating member 63 so that a gap is provided between the first positive-electrode current collector 6a and the cover main portion 80a. According to this structure, even when the electrode assembly 3 moves toward the sealing plate 2 and comes into contact with the cover 80, the cover 80 absorbs the impact to some extent and thereby prevents the electrode assembly 3 from being damaged.

Preferably, the cover 80 is connected to at least one of the first insulating member 10 and the second insulating member 63. More preferably, the cover 80 is connected to each of the first insulating member 10 and the second insulating member 63. For example, preferably, the cover 80 includes the cover main portion 80a and the pair of arm portions 80b that extend from the cover main portion 80a toward the sealing plate 2, and the arm portions 80b are connected to the first insulating member 10. In addition, preferably, the cover main portion 80a is provided with the cover wall portion 80e, and the cover wall portion 80e is connected to the second insulating member 63.

The cover main portion 80a preferably has through holes. Such a structure enables gas to smoothly flow below the deformation plate 62. The base openings 80d formed in the cover main portion 80a at positions near the base ends of the arm portions 80b preferably serve as the through holes.

When the positive-electrode current collecting member includes the first positive-electrode current collector 6a and the second positive-electrode current collector 6b, the cover 80 is preferably disposed between the electrode assembly 3 and the connecting portion between the first positive-electrode current collector 6a and the second positive-electrode current collector 6b. According to this structure, even when the rectangular secondary battery 20 is strongly vibrated or impacted and the electrode assembly 3 is moved toward the sealing plate 2, the electrode assembly 3 can be prevented from coming into contact with the connecting portion between the first positive-electrode current collector 6a and the second positive-electrode current collector 6b and causing damage or breakage of the connecting portion between the first positive-electrode current collector 6a and the second positive-electrode 6b current collector. A surface of the cover main portion 80a that faces the first positive-electrode current collector 6a is preferably formed such that a portion thereof that faces the connecting portion between the first positive-electrode current collector 6a and the second positive-electrode current collector 6b is recessed from a portion thereof that faces the connecting portion between the deformation plate 62 and the first positive-electrode current collector 6a.

The cover 80 is preferably connected to at least one of the first insulating member 10 and the second insulating member 63 after the second positive-electrode current collector 6b to which the positive-electrode tabs 40 are connected is connected to the first positive-electrode current collector 6a to which the deformation plate 62 is connected.

As illustrated in FIGS. 8 and 9, the deformation plate 62 includes the annular rib 62b that projects toward the electrode assembly 3 (upward in FIG. 9) at the outer peripheral edge thereof. The annular rib 62b is fitted to an end portion of the tubular portion 61b of the conductive member 61 that is adjacent to the electrode assembly 3, and is connected to the conductive member 61 by welding. The deformation plate 62 also includes the annular thin portion 62c in a region closer to the center than the annular rib 62b is. According to this structure, even if the thickness of the deformation plate 62 is increased, the deformation plate 62 can be smoothly deformed when the pressure in the rectangular exterior body 1 reaches or exceeds the predetermined value. The thermal capacity of the deformation plate 62 can be increased by increasing the thickness of the deformation plate 62. Therefore, even when the weak portions of the first positive-electrode current collector 6a, such as the thin portion 6f and the notch 6g, are heated, the generated heat is transferred to the deformation plate 62, and fusion breakage of the weak portions of the first positive-electrode current collector 6a, such as the thin portion 6f and the notch 6g, can be prevented. The annular connection rib 6h is preferably provided along the edge portion around the connection hole 6c in the first positive-electrode current collector 6a. Accordingly, the thermal capacity of the first positive-electrode current collector 6a can be increased in regions around the weak portions thereof, such as the thin portion 6f and the notch 6g. As a result, fusion breakage of the weak portions of the first positive-electrode current collector 6a, such as the thin portion 6f and the notch 6g, can be more effectively prevented.

The deformation plate 62 is preferably inclined toward the sealing plate 2 in the direction from the outer peripheral edge toward the center thereof. The annular thin portion 62c is preferably formed by forming a recess in a surface of the deformation plate 62 that faces the electrode assembly 3. Such a configuration enables a smooth deformation of the deformation plate 62. The width of the annular thin portion 62c in plan view is preferably 1 mm to 3 mm, and more preferably 1.5 mm to 2 mm.

After the gas discharge valve 17 breaks and gas in the battery case 100 is discharged to the outside of the battery case 100, the deformation plate 62 remains unbroken and the conductive-member opening portion 61f in the conductive member 61 is sealed by the deformation plate 62.

As illustrated in FIGS. 9 and 11, the deformation plate 62 includes the stepped projection 62a including the first projecting portion 62a1 and the second projecting portion 62a2 in a central region thereof. The second projecting portion 62a2 is fitted to the connection hole 6c in the first positive-electrode current collector 6a. The outer diameter of the first projecting portion 62a1 is greater than the inner diameter of the connection hole 6c, so that a surface of the first projecting portion 62a1 that faces the electrode assembly 3 is in contact with a top surface 6i of the first positive-electrode current collector 6a. According to this structure, when the connecting portion between the second projecting portion 62a2 of the deformation plate 62 and the connection hole 6c in the first positive-electrode current collector 6a is irradiated with an energy ray, such as a laser beam, the energy ray is prevented from passing through a gap between the first projecting portion 62a1 and a side wall of the connection hole 6c in the first positive-electrode current collector 6a and being scattered in a region above the first positive-electrode current collector 6a. Accordingly, damage or breakage of components due to the energy ray can be reliably prevented. The stepped projection 62a preferably has a stepped recess in a surface thereof that faces the sealing plate 2. The stepped recess preferably has a bottom portion 62d that is closer to the sealing plate 2 than the top surface 6i of the first positive-electrode current collector 6a is.

<<First Modification>>

Figure 19A:
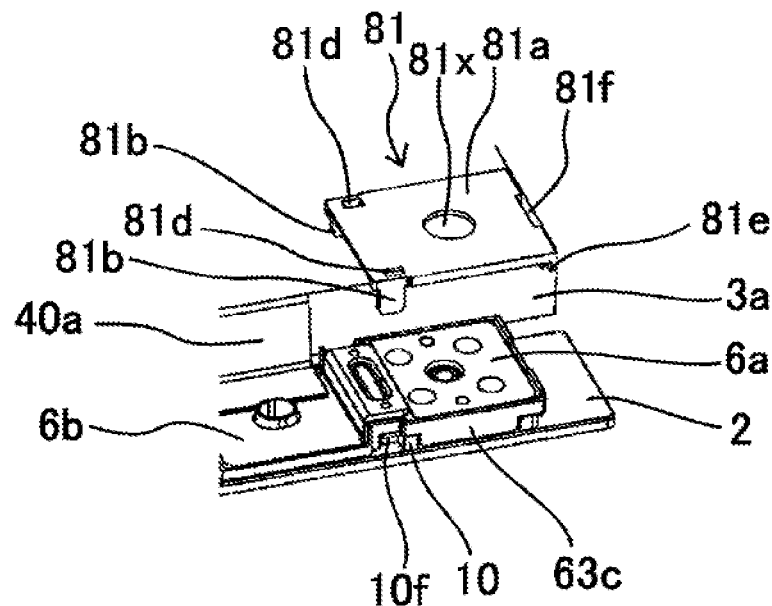
FIG. 19A illustrates a state before a cover of a secondary battery according to a modification is attached to a first insulating member and a second insulating member.
Figure 19B:
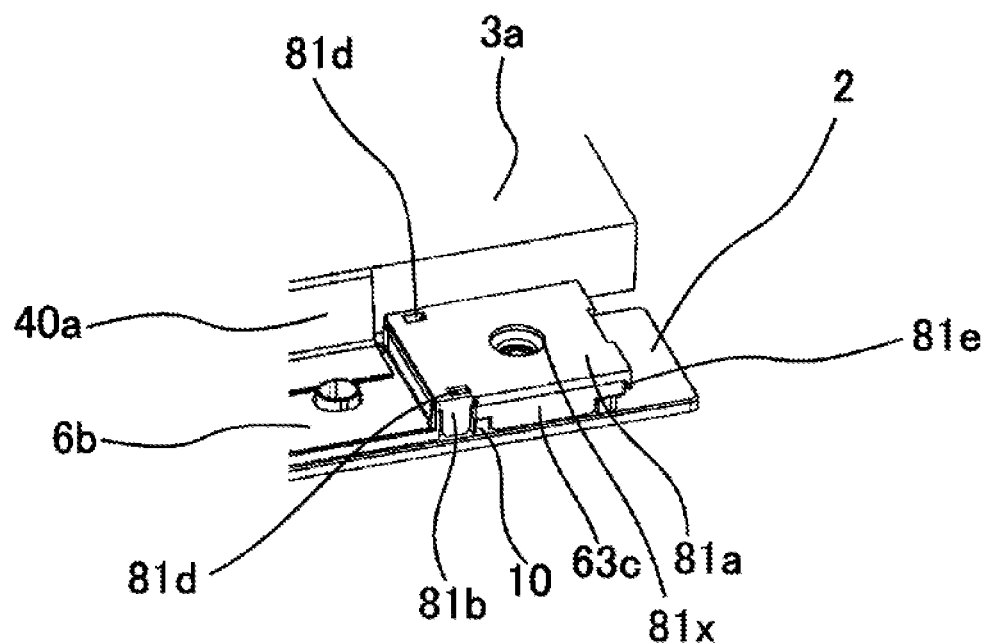
FIG. 19B illustrates a state after the cover of the secondary battery according to the modification is attached to the first insulating member and the second insulating member.

A rectangular secondary battery according to a first modification has a structure similar to that of the rectangular secondary battery 20 according to the embodiment except for the shape of the cover. As illustrated in FIGS. 19A and 19B, a cover 81 according to the first modification includes a cover main portion 81a arranged to face the first positive-electrode current collector 6a and a pair of arm portions 81b that extend toward the sealing plate 2 from both ends of the cover main portion 81a in the short-side direction of the sealing plate 2. The cover 81 also includes a cover wall portion 81e that extends toward the sealing plate 2 from an end of the cover main portion 81a in the long-side direction of the sealing plate 2. Connecting projections are provided on inner surfaces of the arm portions 81b. The connecting projections are connected to the second connecting portions 10f of the first insulating member 10.

The cover main portion 81a has base openings 81d at positions near the base ends of the arm portions 81b. The cover wall portion 81e has a wall portion opening 81f. The cover 81 of the rectangular secondary battery according to the first modification has a cover opening 81x in the cover main portion 81a. The cover opening 81x is located such that the cover opening 81x faces the connecting portion between the deformation plate 62 and the first positive-electrode current collector 6a. Accordingly, the current interruption mechanism can be more smoothly activated.

<<Second Modification>>

The rectangular secondary battery 20 according to the above-described embodiment is configured such that the conductive member 61 includes the pressing projection 61e in the region where the conductive member 61 faces the first insulating member 10. A rectangular secondary battery according to a second modification has a structure similar to that of the rectangular secondary battery 20 according to the above-described embodiment except that a pressing projection is provided not on the conductive member but on a portion of the sealing plate that faces the first insulating member 10.

Figure 20:
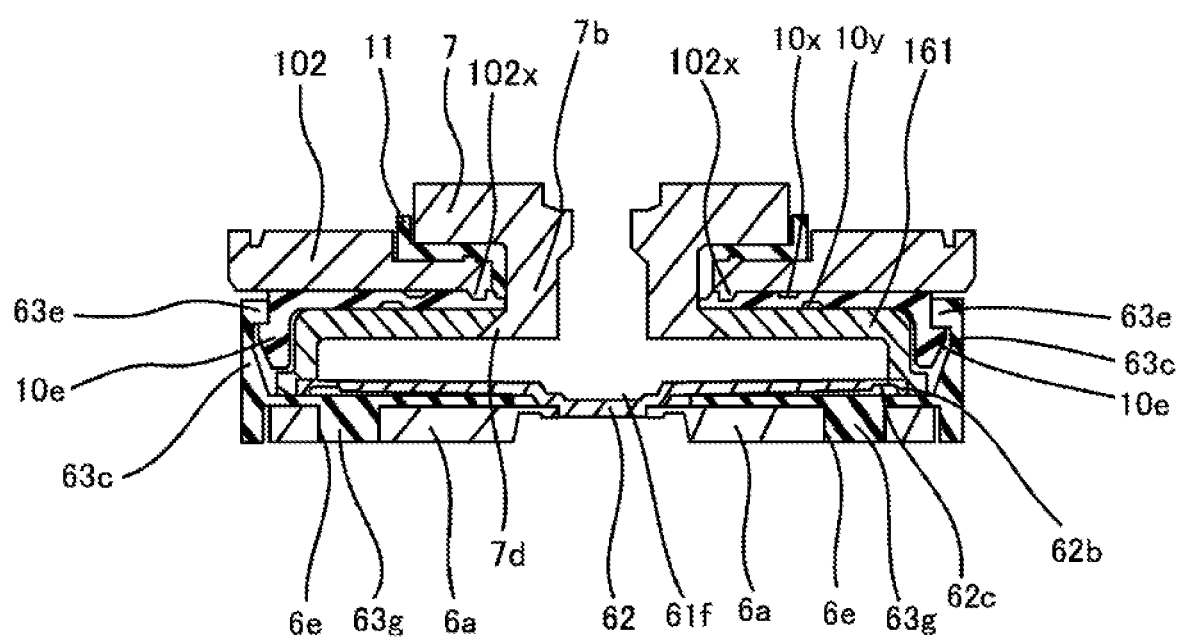
FIG. 20 is a sectional view of a part including a current interruption mechanism of a secondary battery according to a modification.

FIG. 20 is a sectional view of a part of the secondary battery according to the second modification, the part including a current interruption mechanism. The sectional view of FIG. 20 corresponds to FIG. 8B. As illustrated in FIG. 20, a pressing projection 102x is provided on a portion of a sealing plate 102 that faces the first insulating member 10. According to this structure, the first insulating member 10 is strongly pressed by the pressing projection 102x, so that gas does not flow toward the connecting portion between a conductive member 161 and the positive electrode terminal 7. Accordingly, gas in the region around the electrode assembly does not leak into the space defined by the conductive member 161 and the deformation plate 62. As a result, a delay in the activation of the current interruption mechanism can be prevented. In addition, when the sealing plate 102 includes the pressing projection 102x, the first insulating member 10 can be easily prevented from being warped such that a peripheral portion thereof approaches the electrode assembly 3. The pressing projection 102x preferably has an annular shape in plan view.

When the sealing plate 102 and the positive electrode terminal 7 are viewed in the direction perpendicular to the sealing plate 102, the pressing projection 102x preferably overlaps the crimped portion 7d (large diameter portion) of the inserting portion 7b of the positive electrode terminal 7.

The rectangular secondary battery according to the second modification is configured such that the conductive member 161 has no pressing projection. However, the conductive member 161 may also have a pressing projection.

<Others>

Portions expected to break in response to a deformation of the deformation plate are preferably the weak portions of the current collecting member, the connecting portion between the current collecting member and the deformation plate, or the weak portions of the deformation plate. Preferred examples of the weak portions include thin portions and notches.

In the above-described embodiment, the first insulating member is disposed between the sealing plate and the conductive member, and the second insulating member is disposed between the deformation plate and the first positive-electrode current collector of the positive-electrode current collecting member. However, as a modification, the second insulating member may be omitted, and the first insulating member disposed between the sealing plate and the conductive member may be fixed to the positive-electrode current collecting member.

In the above-described embodiment, the positive electrode terminal and the conductive member are separate components. However, the positive electrode terminal and the conductive member may instead be formed as a single component. In this case, the component that serves as the positive electrode terminal and the conductive member may be attached to the sealing plate by inserting a portion thereof corresponding to the positive electrode terminal through the positive-electrode-terminal attachment hole in the sealing plate from a side facing the inside of the battery and crimping the portion corresponding to the positive electrode terminal on a side facing the outside of the battery.

The first insulating member, the second insulating member, and the cover are preferably made of a resin. For example, polypropylene, polyethylene, perfluoroalkoxy alkane (PFA), polytetrafluoroethylene (PTFE), or ethylene tetrafluoroethylene copolymer (ETFE) may be used.

In the above-described embodiment, the electrode assembly 3 is formed of two electrode assembly elements (3a and 3b). However, the electrode assembly 3 is not limited to this. The electrode assembly 3 may instead be a single stacked electrode assembly. Alternatively, the electrode assembly 3 may be a single wound electrode assembly in which an elongated positive electrode plate and an elongated negative electrode plate are wound with a separator interposed therebetween. Also, each of the electrode assembly elements (3a and 3b) is not limited to a stacked electrode assembly, and may instead be a wound electrode assembly in which an elongated positive electrode plate and an elongated negative electrode plate are wound with a separator interposed therebetween.

When the electrode assembly is a stacked electrode assembly including a plurality of positive electrode plates and a plurality of negative electrode plates or when the electrode assembly is a wound electrode assembly having a winding axis extending in a direction perpendicular to the sealing plate, the electrode assembly is preferably configured such that end portions of the positive electrode plates, end portions of the negative electrode plates, and end portions of the separators are adjacent to the sealing plate. According to this structure, when the sealing plate has the electrolyte introduction hole, the electrolyte can be easily introduced into the electrode assembly. In this case, the end portions of the separators that are adjacent to the sealing plate preferably project toward the sealing plate 2 beyond the end portions of the negative electrode active material mixture layers of the negative electrode plates that are adjacent to the sealing plate. In addition, the electrode assembly is preferably configured such that the end portions of the separators that are adjacent to the sealing plate project toward the sealing plate beyond the end portions of the positive electrode active material mixture layers of the positive electrode plates that are adjacent to the sealing plate. In addition, preferably, the positive electrode plates and the separators are bonded together by adhesive layers, and the negative electrode plates and the separators are bonded together by adhesive layers. According to this structure, the risk that the positive electrode active material mixture layers and the negative electrode active material mixture layers will come into contact with the second insulating member and the positive electrode active material layers or the negative electrode active material layers will be damaged can be reliably eliminated.

REFERENCE SIGNS LIST

20 . . . rectangular secondary battery 1 . . . rectangular exterior body 2 . . . sealing plate 2a . . . positive-electrode-terminal attachment hole 2b . . . negative-electrode-terminal attachment hole 100 . . . battery case 3 . . . electrode assembly 3a . . . first electrode assembly element 3b . . . second electrode assembly element 4 . . . positive electrode plate 4a . . . positive electrode core 4b . . . positive electrode active material mixture layer 4d . . . positive-electrode protecting layer 40 . . . positive-electrode tab 40a . . . first positive-electrode tab group 40b . . . second positive-electrode tab group 5 . . . negative electrode plate 5a . . . negative electrode core 5b . . . negative electrode active material mixture layer 50 . . . negative-electrode tab 50a . . . first negative-electrode tab group 50b . . . second negative-electrode tab group 6 . . . positive-electrode current collecting member 6a . . . first positive-electrode current collector 6c . . . connection hole 6d . . . fixing hole 6d1 . . . small diameter portion 6d2 . . . large diameter portion 6e . . . displacement prevention hole 6f . . . thin portion 6g . . . notch 6h . . . connection rib 6i . . . top surface 6x . . . current-collector projection 6w . . . current-collector second recess 6b . . . second positive-electrode current collector 6b1 . . . current-collector first region 6b2 . . . current-collector second region 6b3 . . . current-collector third region 6k . . . target hole 6m . . . current-collector first recess 6y . . . current-collector first opening 6z . . . current-collector second opening 7 . . . positive electrode terminal 7a . . . flange 7b . . . inserting portion 7c . . . terminal through hole 7d . . . crimped portion 7x . . . terminal sealing member 7y . . . metal member 7z . . . rubber member 8 . . . negative-electrode current collecting member 8a . . . first negative-electrode current collector 8x . . . current-collector projection 8w . . . current-collector second recess 8b . . . second negative-electrode current collector 8b1 . . . current-collector first region 8b2 . . . current-collector second region 8b3 . . . current-collector third region 8e . . . target hole 8f . . . current-collector first recess 8y . . . current-collector first opening 9 . . . negative electrode terminal 10 . . . first insulating member 10a . . . first-insulating-member main portion 10b . . . first side wall 10c . . . second side wall 10d . . . second terminal-receiving hole 10e . . . first connecting portion 10f . . . second connecting portion 10g . . . recess 10x . . . first groove 10y . . . second groove 11 . . . outer insulating member 11a . . . first terminal-receiving hole 12 . . . inner insulating member 13 . . . outer insulating member 14 . . . insulating sheet 15 . . . electrolyte introduction hole 16 . . . sealing plug 17 . . . gas discharge valve 60 . . . current interruption mechanism 61 . . . conductive member 61a . . . conductive-member base portion 61b . . . tubular portion 61c . . . third terminal-receiving hole 61d . . . flange 61e . . . pressing projection 61f . . . conductive-member opening portion 61g . . . tapered portion 62 . . . deformation plate 62a . . . stepped projection 62a1 . . . first projecting portion 62a2 . . . second projecting portion 62b . . . annular rib 62c . . . annular thin portion 62d . . . bottom portion of stepped recess 63 . . . second insulating member 63x . . . insulating-member first region 63a . . . insulating-member first opening 63b . . . third wall portion 63c . . . fourth wall portion 63d . . . third connecting portion 63e . . . fourth connecting portion 63f . . . fixing projection 63f1 . . . large-diameter portion 63g . . . displacement prevention projection 63h . . . lug portion 63y . . . insulating-member second region 63i . . . insulating-member second opening 63k . . . insulating-member annular rib 63z . . . insulating-member third region 80 . . . cover 80a . . . cover main portion 80b . . . arm portion 80c . . . connecting projection 80d . . . base opening 80e . . . cover wall portion 80f . . . wall portion opening 81 . . . cover 81a . . . cover main portion 81b . . . arm portion 81d . . . base opening 81e . . . cover wall portion 81f . . . wall portion opening 81x . . . cover opening 90 . . . welded connecting portion 102 . . . sealing plate 102x . . . pressing projection 161 . . . conductive member

The invention claimed is:

1. A secondary battery comprising:
an electrode assembly including a positive electrode plate and a negative electrode plate;
an exterior body having an opening and containing the electrode assembly;
a sealing plate that seals the opening;
a conductive member having an opening portion at a side facing the electrode assembly and disposed near a side of the sealing plate facing the electrode assembly;
a deformation plate that seals the opening portion and that is deformed in response to an increase in a pressure in the exterior body;
a current collecting member that electrically connects the positive electrode plate or the negative electrode plate to the deformation plate, wherein the current collecting member includes an interposed region located between the deformation plate and the electrode assembly; and
a terminal that is electrically connected to the positive electrode plate or the negative electrode plate via the current collecting member, the deformation plate, and the conductive member,
wherein a cover is disposed between the interposed region and the electrode assembly,
wherein the cover includes:
a cover main body which has a plate-like shape;
a pair of first connection portions extending from the cover main body toward the sealing plate, the pair of first connection portions aligned with each other in a short direction of the sealing plate; and
a second connection portion extending from the cover main body toward the sealing plate, the second connection portion aligned with the pair of first connection portions in a longitudinal direction of the sealing plate,
wherein a gap is provided between the pair of first connection portions and the second connection portion in the longitudinal direction of the sealing plate, and
wherein a conductive path between the positive electrode plate and the terminal or between the negative electrode plate and the terminal is broken in response to a deformation of the deformation plate.

2. The secondary battery according to claim 1, wherein an insulating member is disposed between the deformation plate and the current collecting member, and
wherein the insulating member is separate from the cover.

3. The secondary battery according to claim 2, wherein the insulating member disposed between the deformation plate and the current collecting member includes a fixing projection,
wherein the current collecting member has a fixing hole, and
wherein the insulating member disposed between the deformation plate and the current collecting member is fixed to the current collecting member such that the fixing projection is fitted to the fixing hole.

4. The secondary battery according to claim 1, wherein a first insulating member is disposed between the sealing plate and the conductive member,
wherein a second insulating member is disposed between the deformation plate and the current collecting member,
wherein the cover is separate from the first insulating member and the second insulating member, and
wherein the cover is connected to at least one of the first insulating member and the second insulating member.

5. The secondary battery according to claim 1, wherein the electrode assembly includes a positive-electrode tab connected to the positive electrode plate and a negative-electrode tab connected to the negative electrode plate at a side thereof adjacent to the sealing plate, and
wherein the positive-electrode tab or the negative-electrode tab is connected to a portion of the current collecting member that extends along the sealing plate.

6. The secondary battery according to claim 5, wherein an insulating member is disposed between the sealing plate and the current collecting member.

7. The secondary battery according to claim 1, wherein the current collecting member includes a first current collecting member connected to the deformation plate and a second current collecting member connected to the positive-electrode tab or the negative-electrode tab, and wherein the cover is disposed between the electrode assembly and a connecting portion between the first current collecting member and the second current collecting member.

8. The secondary battery according to claim 1, wherein a gap is provided between the current collecting member and the cover in a direction perpendicular to the sealing plate.

9. The secondary battery according to claim 1,
wherein the deformation plate viewed in the thickness direction of the sealing plate has a round shape,
wherein a center of the round shape is located between the pair of first connection portions and the second connection portion in the longitudinal direction of the sealing plate.

* * * * *